(12) United States Patent
Berard et al.

(10) Patent No.: US 11,479,023 B2
(45) Date of Patent: *Oct. 25, 2022

(54) LUMINOUS GLAZED VEHICLE ROOF, VEHICLE INCORPORATING SAME AND MANUFACTURE

(71) Applicant: SAINT-GOBAIN GLASS FRANCE, Courbevoie (FR)

(72) Inventors: Mathieu Berard, Paris (FR); Olivier Delrieu, Epinay sur Orge (FR); Pascal Bauerle, Davenescourt (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 202 days.

This patent is subject to a terminal disclaimer.

(21) Appl. No.: 16/768,391

(22) PCT Filed: Nov. 28, 2018

(86) PCT No.: PCT/FR2018/053020
§ 371 (c)(1),
(2) Date: May 29, 2020

(87) PCT Pub. No.: WO2019/106289
PCT Pub. Date: Jun. 6, 2019

(65) Prior Publication Data
US 2020/0298534 A1  Sep. 24, 2020

(30) Foreign Application Priority Data
Nov. 30, 2017 (FR) ........................ 1761420

(51) Int. Cl.
*B32B 7/12* (2006.01)
*B32B 17/10* (2006.01)
(Continued)

(52) U.S. Cl.
CPC .......... *B32B 17/10541* (2013.01); *B32B 7/12* (2013.01); *B32B 17/10036* (2013.01);
(Continued)

(58) Field of Classification Search
CPC ................ B32B 17/10541; B32B 7/12; B32B 17/10036; B32B 17/10761
See application file for complete search history.

(56) References Cited

U.S. PATENT DOCUMENTS

2008/0239200 A1  10/2008  Hirai
2010/0302794 A1  12/2010  Oomen et al.
(Continued)

FOREIGN PATENT DOCUMENTS

EP  0 844 075 A1  5/1998
EP  2 907 732 A1  8/2015
(Continued)

OTHER PUBLICATIONS

International Search Report as issued in International Patent Application No. PCT/FR2018/053020, dated Feb. 26, 2019.
(Continued)

*Primary Examiner* — Elizabeth E Mulvaney
(74) *Attorney, Agent, or Firm* — Pillsbury Winthrop Shaw Pittman LLP

(57) ABSTRACT

The present invention relates to a luminous vehicle sunroof that includes a first glazing with first and second main faces, a light-emitting element such as an OLED or QLED and a collimating optical system with one or more optical films.

28 Claims, 11 Drawing Sheets

(51) Int. Cl.
*B60Q 3/51* (2017.01)
*B60Q 3/76* (2017.01)
*B60Q 3/20* (2017.01)
*B60Q 3/74* (2017.01)
*B32B 27/08* (2006.01)
*B32B 37/06* (2006.01)
*B32B 37/10* (2006.01)
*F21V 5/00* (2018.01)
*G02B 27/30* (2006.01)
*F21Y 115/15* (2016.01)
*F21W 106/00* (2018.01)

(52) U.S. Cl.
CPC ........ *B32B 17/10761* (2013.01); *B32B 27/08* (2013.01); *B32B 37/06* (2013.01); *B32B 37/1009* (2013.01); *B60Q 3/20* (2017.02); *B60Q 3/51* (2017.02); *B60Q 3/74* (2017.02); *B60Q 3/76* (2017.02); *F21V 5/005* (2013.01); *G02B 27/30* (2013.01); *B32B 2255/10* (2013.01); *B32B 2307/10* (2013.01); *B32B 2307/202* (2013.01); *B32B 2307/30* (2013.01); *B32B 2307/412* (2013.01); *B32B 2457/206* (2013.01); *B32B 2605/08* (2013.01); *F21W 2106/00* (2018.01); *F21Y 2115/15* (2016.08)

(56) References Cited

U.S. PATENT DOCUMENTS

2016/0273731 A1   9/2016   Schiccheri
2018/0370195 A1   12/2018  Laluet

FOREIGN PATENT DOCUMENTS

| WO | WO 2005/018283 A1 | 2/2005 |
| WO | WO 2012/025685 A1 | 3/2012 |
| WO | WO 2013/175101 A1 | 11/2013 |
| WO | WO 2015/031594 A2 | 3/2015 |
| WO | WO 2015/066201 A1 | 5/2015 |
| WO | WO 2015/079159 A1 | 6/2015 |
| WO | WO 2017/103425 A1 | 6/2017 |
| WO | WO 2017/168077 A1 | 10/2017 |
| WO | WO 2017/203171 A1 | 11/2017 |
| WO | WO 2017/203175 A1 | 11/2017 |

OTHER PUBLICATIONS

Non-Final Office Action as issued in U.S. Appl. No. 16/768,464, dated Jul. 21, 2022.

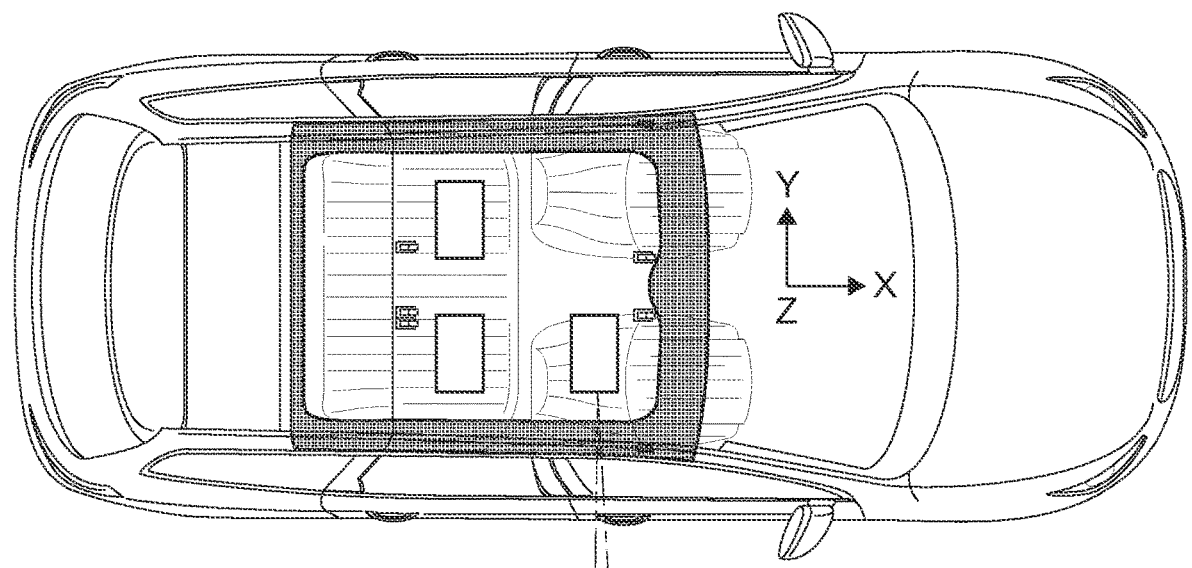
Fig.1
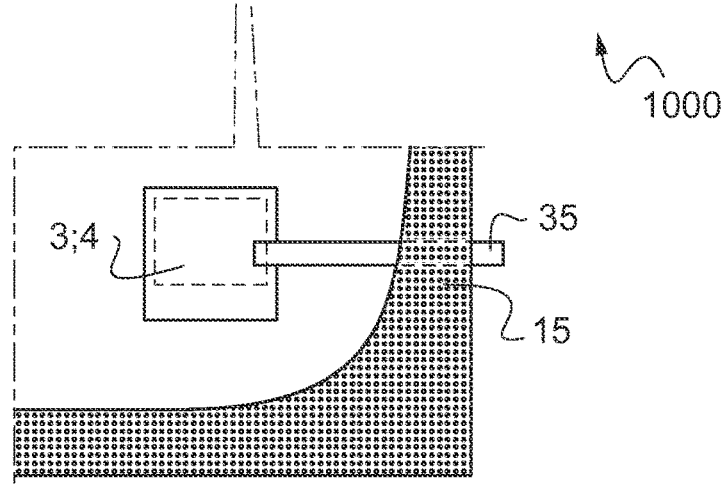

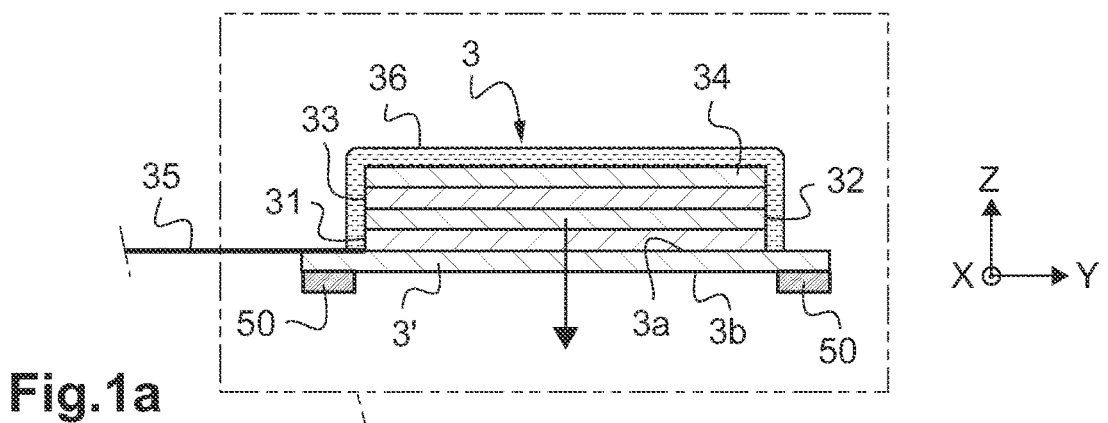
Fig.1a
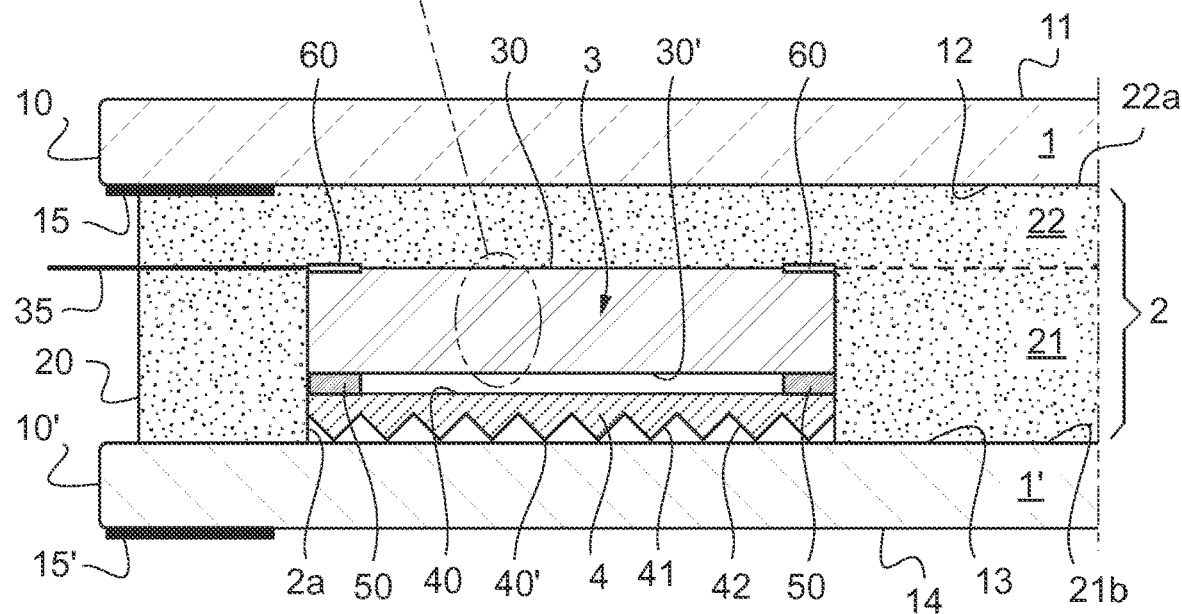
Fig.1b
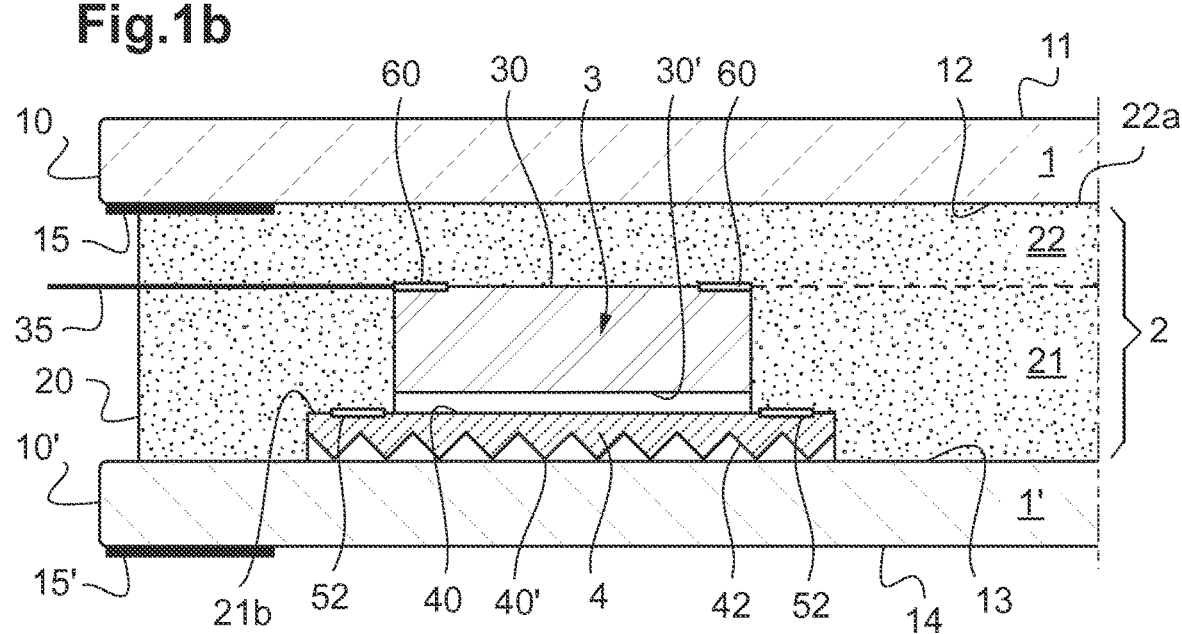

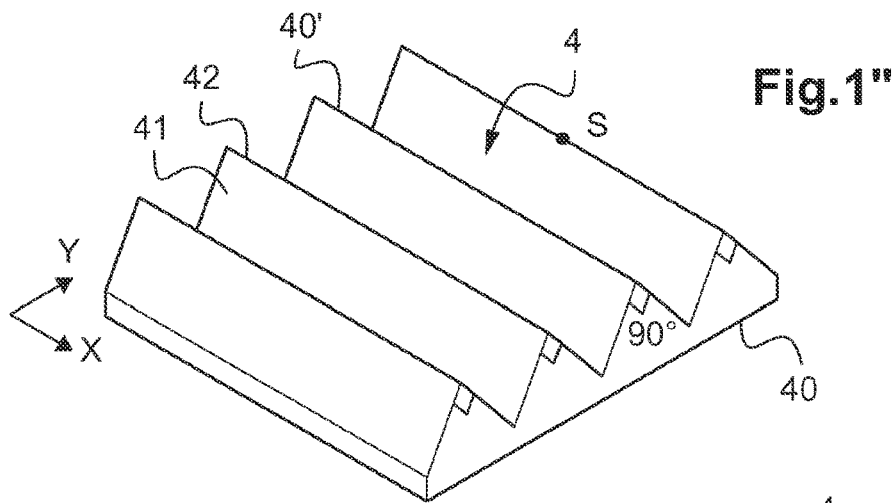
Fig.1"
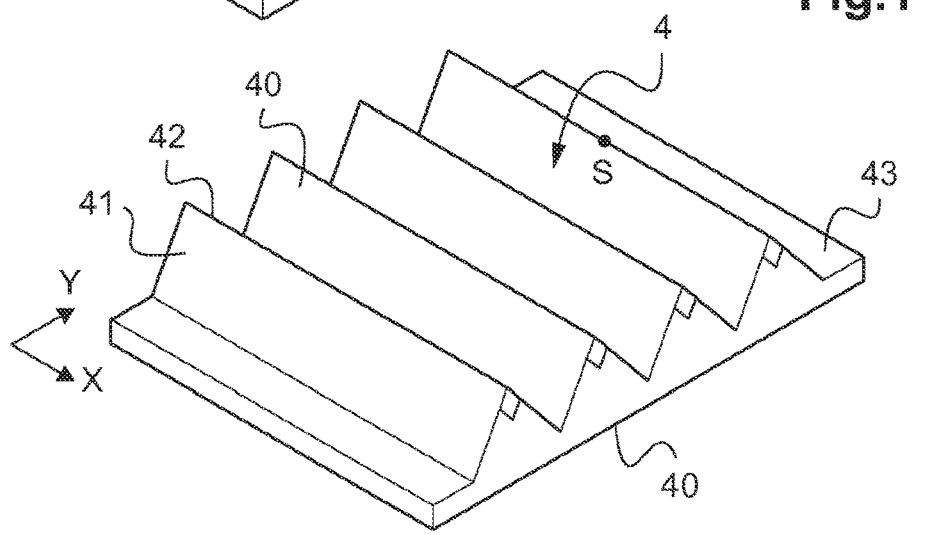
Fig.1'''
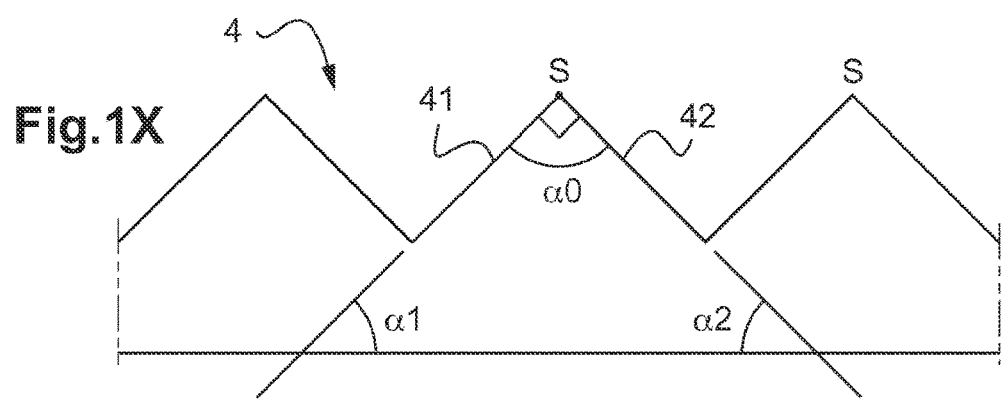
Fig.1X
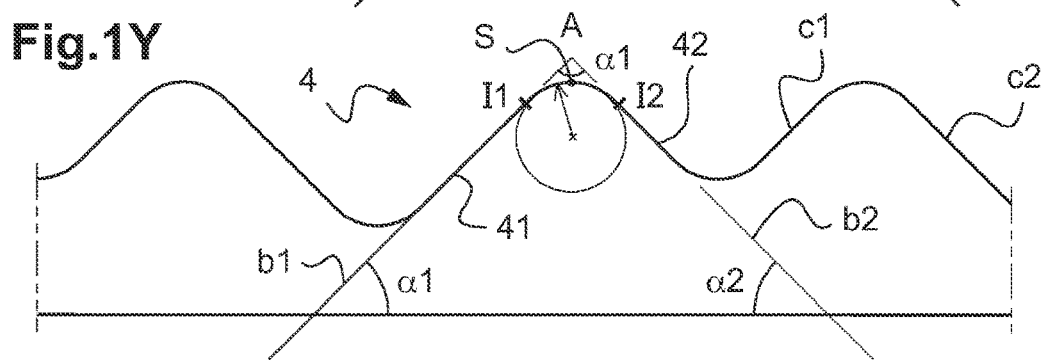
Fig.1Y

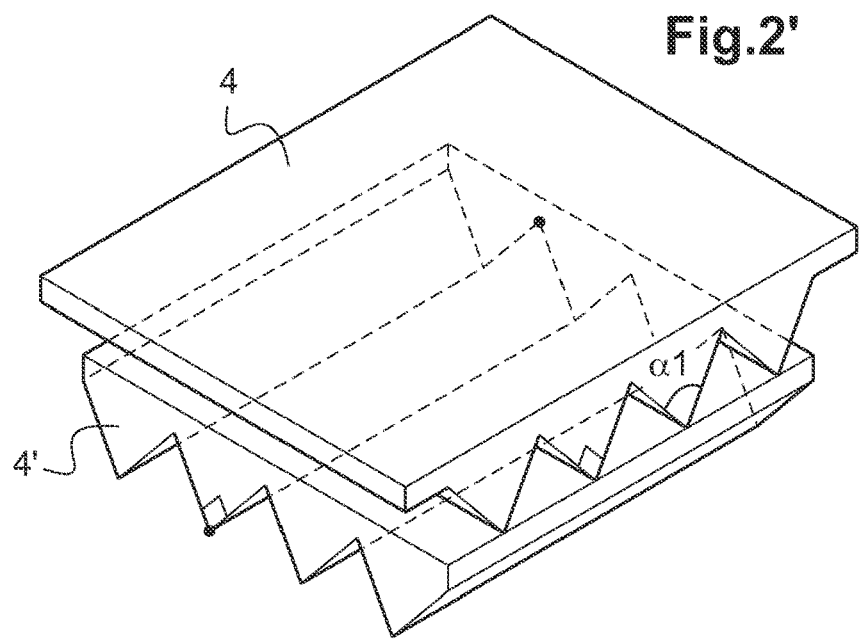
Fig.2'
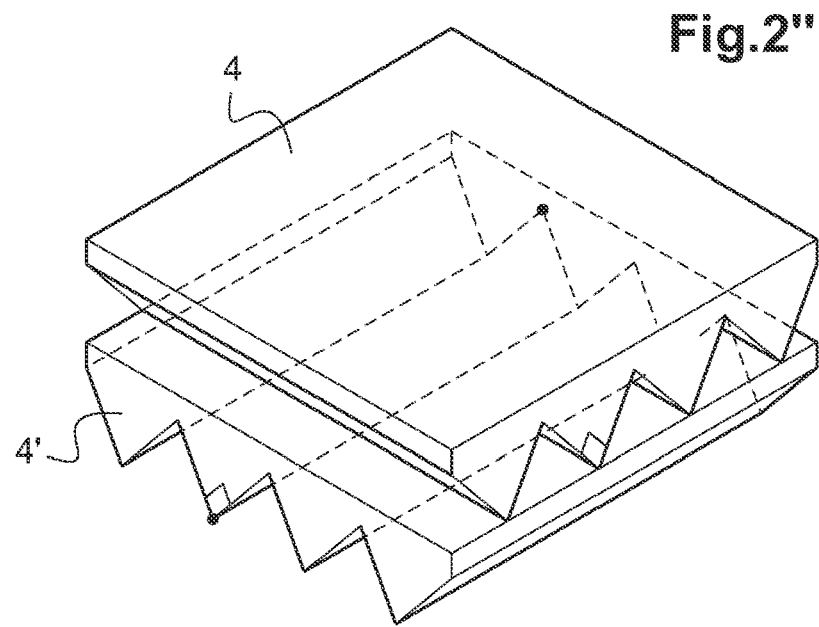
Fig.2"
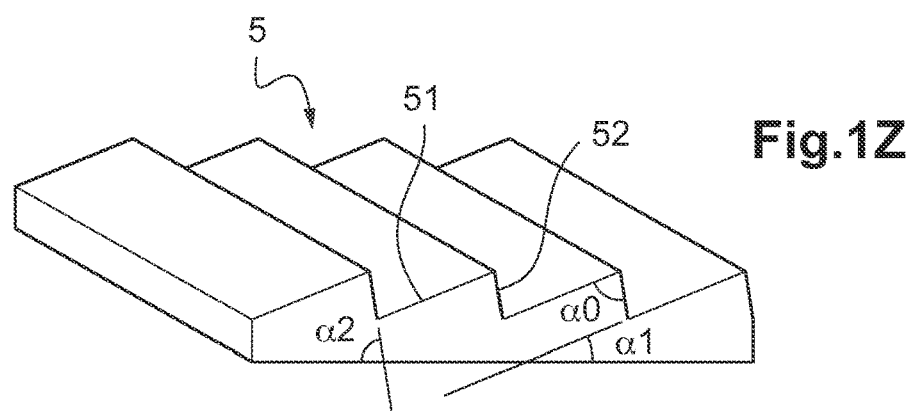
Fig.1Z

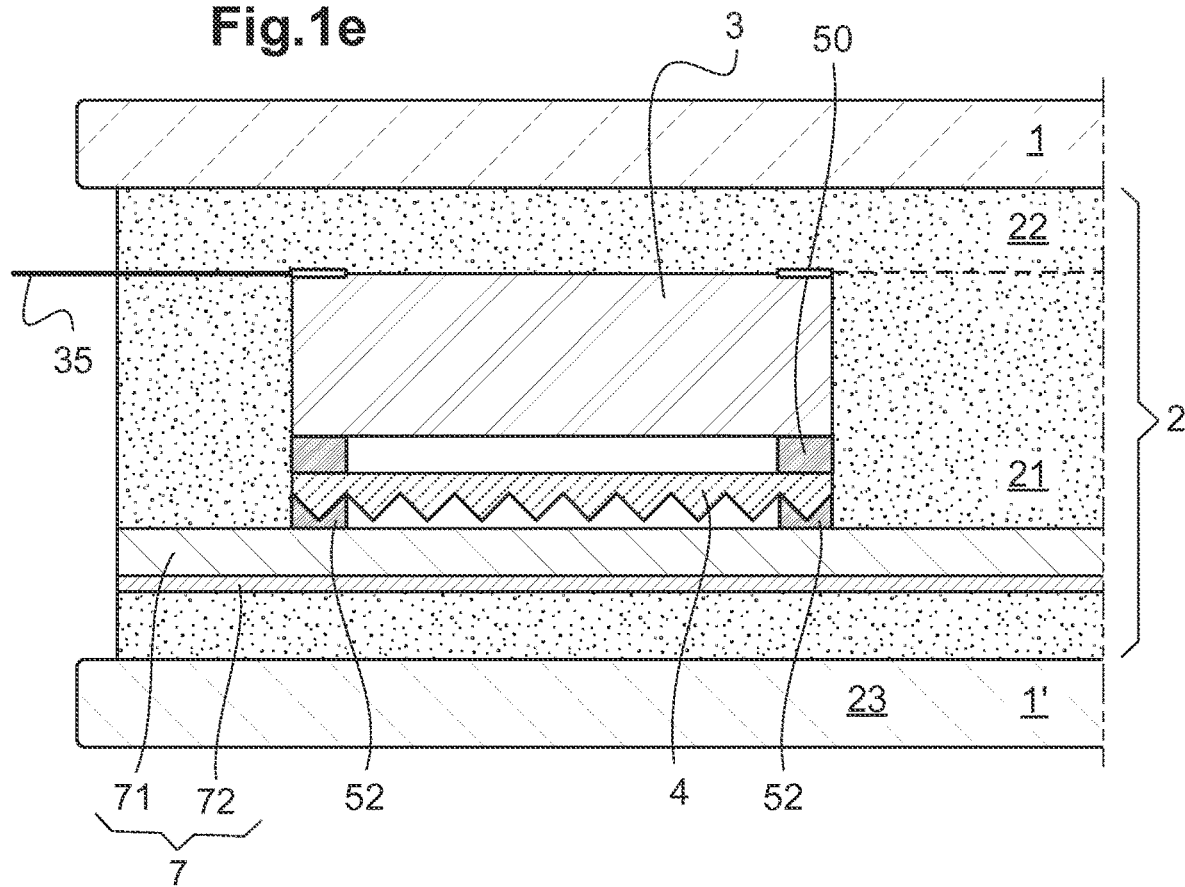
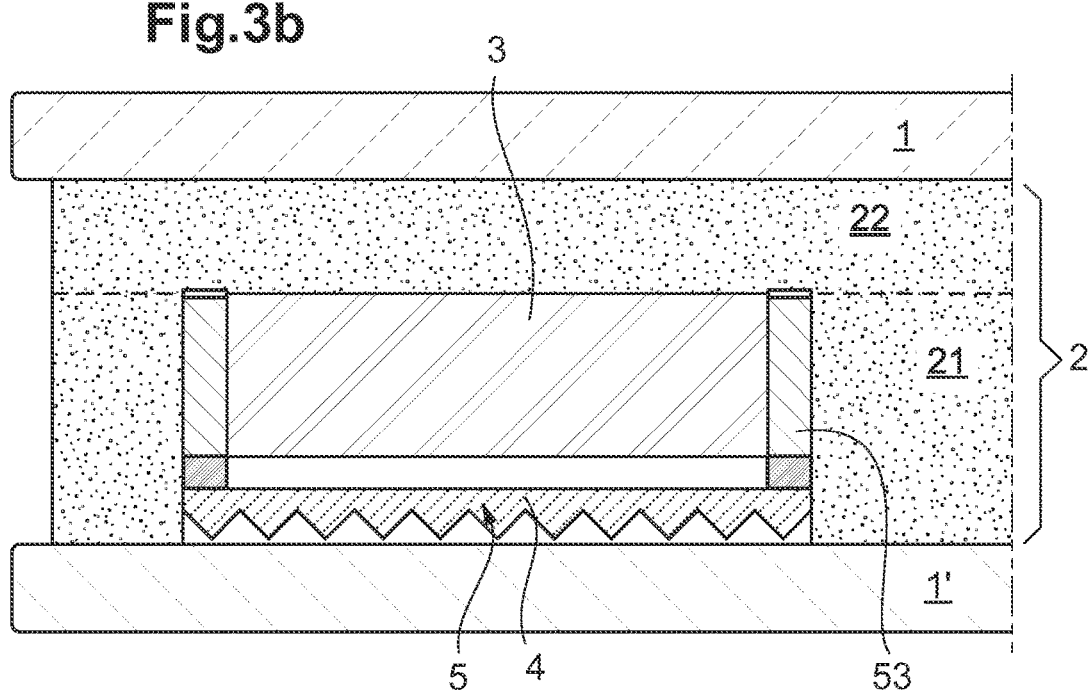

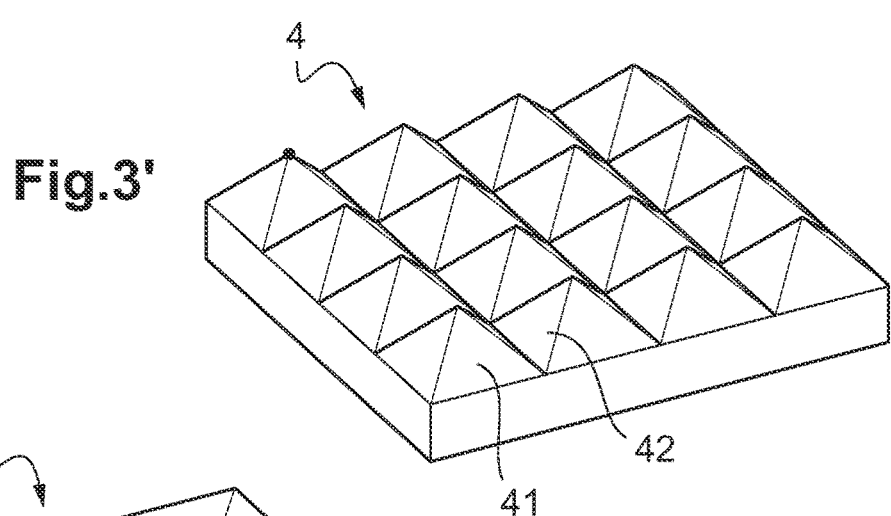
Fig.3'
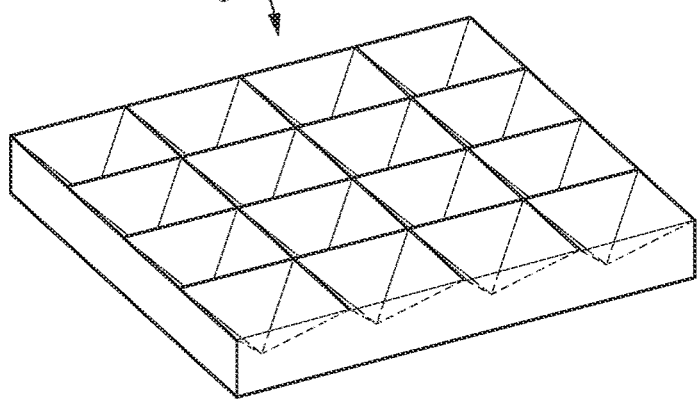
Fig.3"
Fig.3a
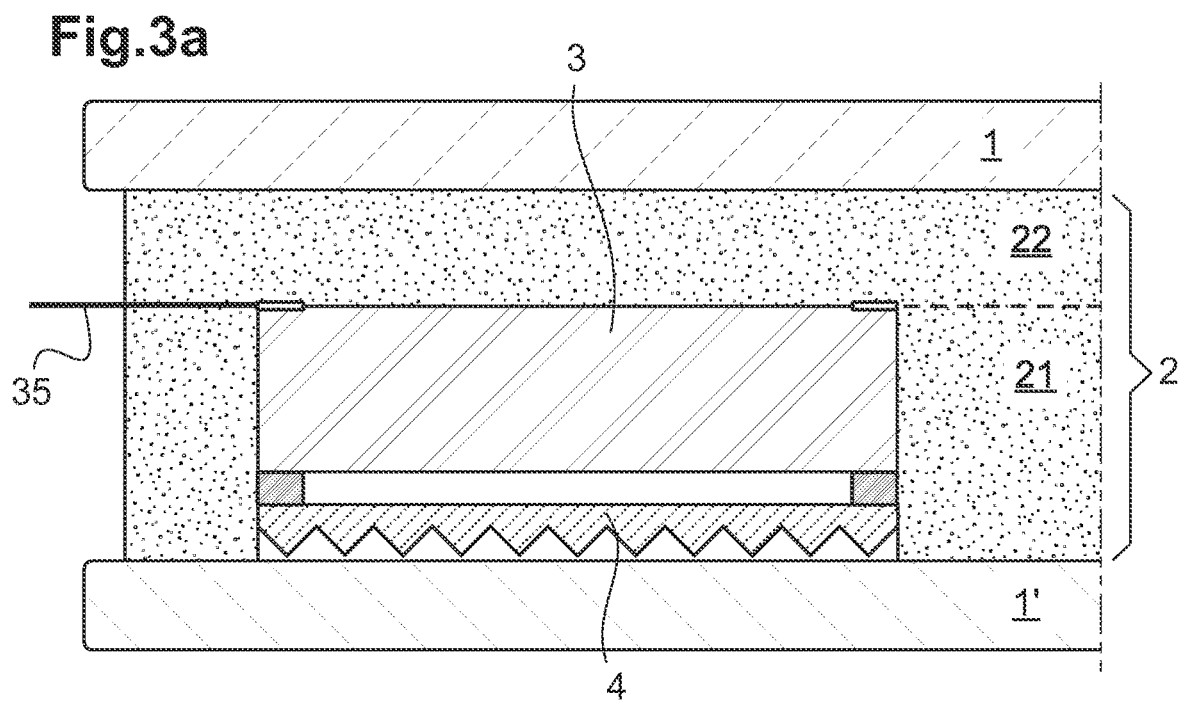

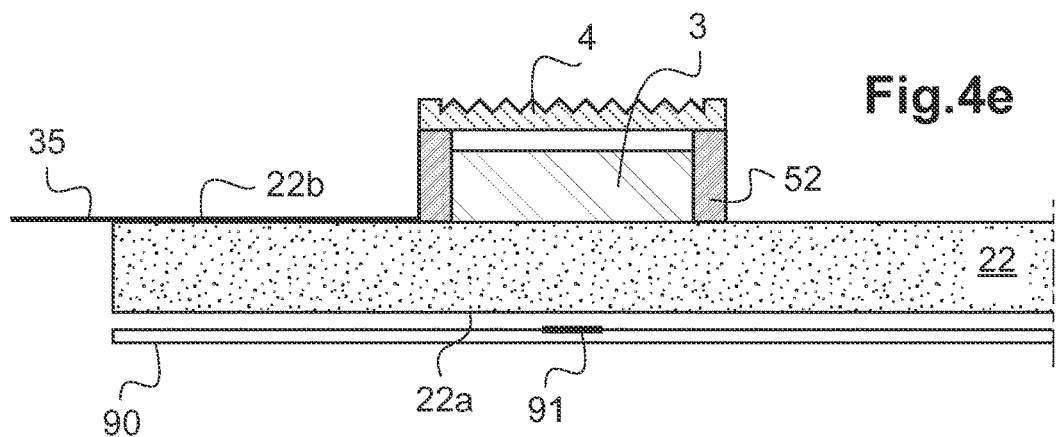
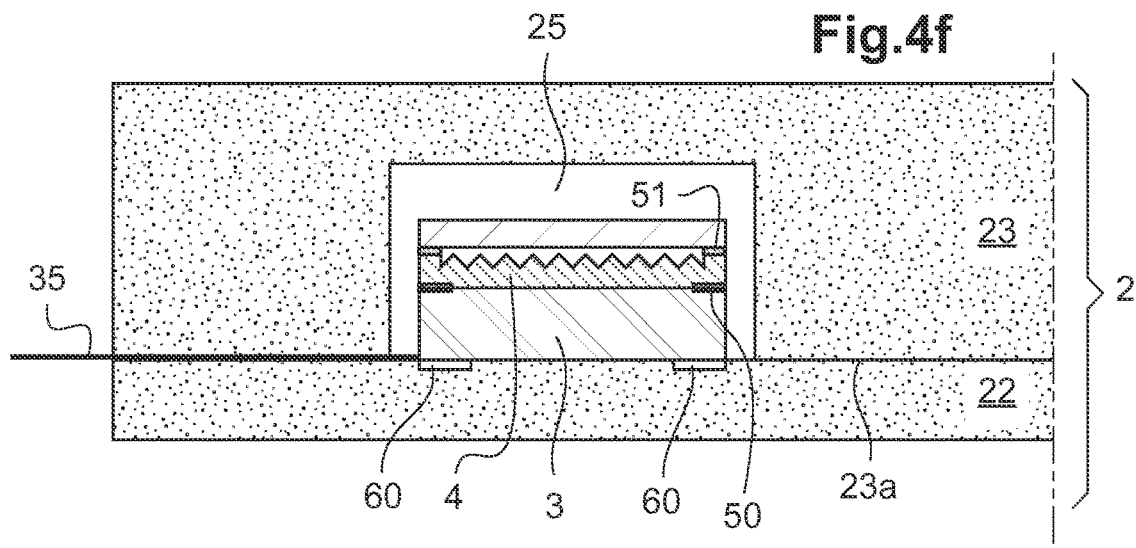
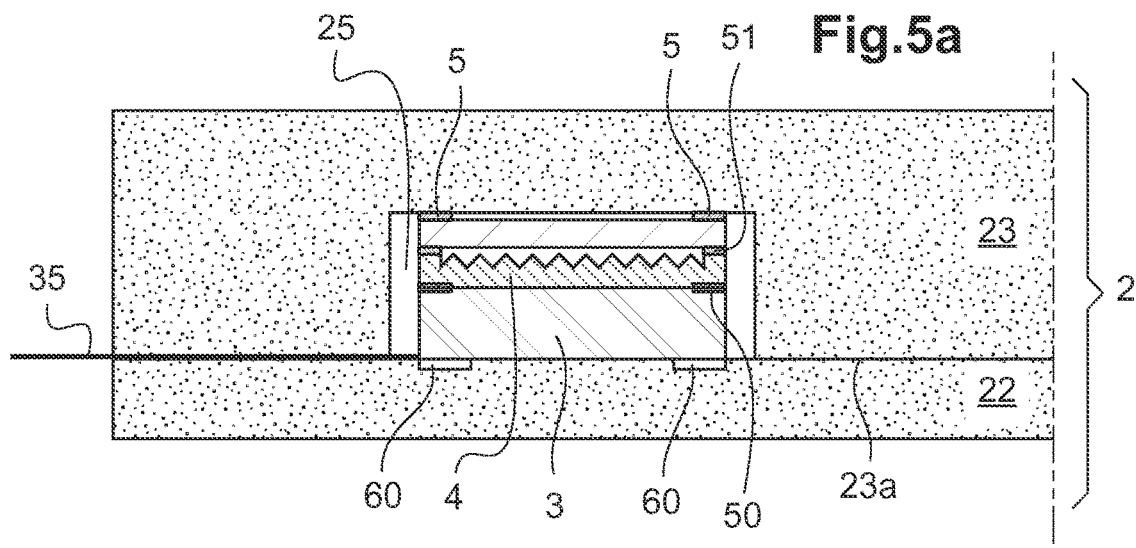

LUMINOUS GLAZED VEHICLE ROOF, VEHICLE INCORPORATING SAME AND MANUFACTURE

CROSS-REFERENCE TO RELATED APPLICATIONS

This application is the U.S. National Stage of PCT/FR2018/053020, filed Nov. 28, 2018, which in turn claims priority to French patent application number 1761420 filed Nov. 30, 2017. The content of these applications are incorporated herein by reference in their entireties.

The invention relates to a luminous glazed vehicle roof and to a vehicle including such a roof and to the manufacture of such a roof.

Glazed motor-vehicle roofs are becoming increasingly common and certain variants thereof are capable of providing ambient lighting.

Patent application WO 2005/018283 proposes to integrate into a laminated roof a light-emitting element equipped with a planar lens in order to direct the light in order to produce a reading light.

Optical performance and the manufacturing process may be improved.

To this end, the first subject of the present application is a luminous glazed roof for a vehicle and in particular a motor vehicle or even a mode of public transport, said roof comprising:

- a first transparent glazing, in particular of rectangular shape, made of in particular (thermally or chemically) tempered mineral or organic glass that is optionally clear, extra-clear or preferably tinted, in particular gray or green, which is preferably curved and intended to be the exterior glazing, with first and second main faces called face F1 (face exterior to the vehicle) and face F2, respectively, and for the motor vehicle, said glazing in particular being made of mineral or organic glass of thickness that is preferably at most 2.5 mm, even of at most 2.2 mm—in particular 1.9 mm, 1.8 mm, 1.6 mm and 1.4 mm—or even of at most 1.3 mm or of at most 1 mm, with an edge face, and a so-called reference direction that is the horizontal between the rear and the front in the plane of the glazing, (in other words the direction of the road), for example corresponding to the longitudinal edge face of the first glazing if the length of the glazing is between the rear and front of the automobile) or corresponding to the lateral edge face of the first glazing if the width of the glazing is between the rear and front of the automobile)
- a light-emitting element face-F2 side and able to emit polychromatic light (preferably in a way that meets standards) on the side opposite to face F2, which is called the interior side, said light-emitting element having an exit surface interior-side (and an entrance surface opposite thereto), with an emission half angle at the apex of 50° to 70°, in particular 55 to 65°, and a main emission direction normal to the plane of said light-emitting element, and even normal to the (mean) plane of the glazing (preferably 90±5°, 90±2° and even 90°)
- facing said light-emitting element and interior-side, a collimation optic having a rear face exit-surface side and a front face opposite to the rear face (preferably on the light-emitting element, for example fastened to its periphery, for example adhesively bonded—with or without spacer—or welded or spaced apart by at most 1 mm from the light-emitting element).

According to the invention:

- the in particular transparent light-emitting element has a light-emitting area of length of at least 5 cm and better still of at least 10 cm and a width of at least 2 cm and better still at least 5 cm, and is preferably of thickness E0 that is subcentimeter-sized and better still of at most 0.6 mm or submillimeter-sized in particular in a laminated glazing,
- the light-emitting element is preferably an organic light-emitting diode, i.e. a so-called OLED, in particular a transparent OLED (TOLED) or a quantum-dot light-emitting diode, i.e. a so-called QLED, or even a TFEL (thin-film electroluminescent element) less easily available in white light
- the collimation optic, which is made of transparent and/or even flexible preferably plastic material (in particular thermoplastic, polyethylene terephthalate PET, polyethylene naphthalate PEN, polyethylene PE, polymethyl methacrylate PMMA, polydimethylsiloxane PDMS, polyamide, polyimide, polycrylate, polyester, polycarbonate, polysulfones, polyethersulfones, thermoplastic polyurethane) is preferably of (total) thickness E1 that is submillimeter-sized and better still of at most 0.3 mm or 0.2 mm or 0.15 mm,
- the collimation optic includes, and even is, a preferably plastic (in particular thermoplastic, PET, PE, PC, PMMA, PDMS) optical film; said film in particular being partially textured in its thickness or as an alternative being a composite film including a smooth preferably plastic (chosen from the aforementioned plastics) transparent carrier with an—organic and/or mineral—transparent overlayer that is partially or entirely textured in its thickness or a set of optical films, each including on a front face opposite to the exit surface (rear face on the side of the exit surface) an array of features with apexes S and with a pitch T between apexes that is from 10 μm to 500 μm preferably with at least 4 or even 10 features facing (directly opposite) the exit (or light-emitting) surface.

According to the invention, the collimation optic thus includes:

a) a first and preferably single optical film, with on the front face said array of two-dimensional features (interior side, toward the face F3 of a second glazing . . . ), in particular a film textured with said array, in particular with a thickness that is now abandoned submillimeter-sized and even of at most 0.3 mm or 0.2 mm or 0.15 mm b) or a set of at least two optical films that are prismatic, preferably of at most two prismatic optical films, including in this order:
- a first optical film with a first array of prisms (prismatic features), in particular a first film textured with said first array, extending longitudinally (along their length) along a first axis, in particular with a thickness of at most 0.3 mm or 0.2 mm or 0.15 mm
- and facing the first optical film (preferably spaced apart therefrom by at most 1 mm or fastened on its periphery for example adhesively bonded—with or without spacer—or welded) a second optical film with a second array of prisms (prismatic features), in particular a film textured with said second array, —crossed with the first array of prismatic features —, extending longitudinally along a second axis (X) making an angle to said first axis of 90±10°, preferably 90±5°, or 90±2° and even of 90°, the first or the second axis makes to the reference direction an angle of at most 10°, better still of at most 5° and even of at most 2°; and even is parallel (angle of 0°), in particular with a thickness of at most 0.3 mm or 0.2 mm or 0.15 mm c) or a single first optical film with the first array of prisms (prismatic features), in particular a film textured with said first array, extending longitudinally along an axis making an angle of at most 10° better still at most 5° and even at most 2° to the reference direction and even parallel, in particular with a thickness that is of at most 0.3 mm or 0.2 mm or 0.15 mm.

For b) and c) each prism is defined by two longitudinal faces the prism preferably having a length L and a width W with L>2 W and better still L>5 W or L>10 W. Each prism has an angle a0 at the apex ranging from 60 to 110°. Furthermore, each longitudinal face makes an angle a1, a2 ranging from 30 to 55°, better still from 35° to 50°, even from 40° to 50° and even of 45°±5°, 45°±1° or of 45° to the plane of the optical film; a1–a2 is preferably smaller than 5° and even than 2° (so-called symmetric prisms).

In particular for b) and c):
  all or some of the prisms are pointed with the two longitudinal faces planar and secant at the apex S each pointed prism being defined by the angle at the apex a0 ranging from 60 to 110°, better still from 70° to 110°, even from 80° to 100° and even of 90°±5°, 90°±2° or of 90°, each longitudinal face making an angle a1, a2 ranging from 30 to 55°, better still from 35° to 50°, even from 40° to 50° and even of 45°±5°, 45°±1° or of 45° to the plane of the film, the difference a1–a2 between said angles (defined by the longitudinal faces) preferably being smaller than 10°, than 5° and even than 2° (so-called symmetric prisms)
  all or some of the prisms are rounded with the two longitudinal faces (each curved or at least partially curved optionally with a planar portion then curved toward the apex), in a plane P normal to the plane of the film and normal to said axis of the prism; the intersection between the plane P and each rounded prism forms a section including two curves C1, C2 that are contiguous at the apex S; two straight lines D1 and D2 passing through the inflection points I1 and I2 of the two curves C1, C2 are defined; each straight line makes an angle a1, a2 ranging from 30° to 55°, better still from 35° to 50°, even from 40° to 50° and even of 45°±5°, 45°±1° or of 45° to the plane of the film, and preferably the difference a1–a2 between said angles (defined by the straight lines D1 and D2) is smaller than 10°, than 5° and even than 2° (so-called symmetric prisms)
each rounded prism being defined by a circle tangent to the apex S with a radius of curvature R1 comprised between T/10 and T/5 (these straight lines D1 and D2 are secant and make an angle a0—corresponding to the angle at the apex— ranging from 60 to 110°, better still from 70° to 110°, even from 80° to 100° and even of 90°±5°, 90°±2 or of 90°).

For a) each two-dimensional feature being defined by a flank, in particular at least 3 secant lateral faces, the two-dimensional feature preferably has an aspect ratio of length L to width W higher than or equal to 1 and of at most 2, even at most 1.5 or of at most 1.1.

When the prisms are contiguous valleys —which are pointed or rounded—are defined with the same tolerances in the angle in the valley as in the angle at the apex described above and in the optional radius of curvature in the valley. For a) in a plane P normal to the film, the two-dimensional feature has an angle a0 ranging from 60 to 110°, better still from 70° to 110°, even from 80° to 100° and even of 90°±5°, 90°±2° or of 90°, each intersection of the flank with the plane P making to the plane of the film an angle a1, a2 ranging from 30 to 55°, better still from 35° to 50°, even from 40° to 50° and even of 45°±5°, 45°±1 or of 45°, the difference a1–a2 between said angles (defined by the 2 intersections) preferably being smaller than 10°, than 5° and even than 2° (so-called "symmetric" features).

In particular for a):
  all or some of the two-dimensional features being pointed, for each pointed two-dimensional feature the intersection between a plane P normal to the film passing through the apex S and the pointed two-dimensional feature forms a triangular section including two straight lines D1 and D2 that are secant at the apex S making the angle a0 at the apex ranging from 60 to 110°, better still from 70° to 110°, even from 80° to 100° and even of 90°±5°, 90°±2 or of 90°,
  each straight line D1, D2 making to the plane of the film an angle a1, a2 ranging from 30 to 55°, better still from 35° to 50°, even from 40° to 50° and even of 45°±5°, 45°±1 or of 45° to the plane of the film, the difference a1–a2 between said angles preferably being smaller than 10°, than 5° and even than 2° (so-called "symmetric" features)
  all or some of the two-dimensional features being rounded, for each rounded two-dimensional feature the intersection between a plane P normal to the plane of the film passing through the apex S forms a section including two curves C1, C2 that are contiguous at the apex S', two straight lines D1 and D2 passing through the inflection points I1 and I2 of the two curves being defined, said straight lines each making an angle a1, a2 ranging from 30 to 55°, better still from 35° to 50°, even from 40° to 50° and even of 45°±5°, 45°±1 or of 45° to the plane of the film, and in said plane P each rounded prism is defined by a circle that is tangent to the apex S and that has a radius of curvature R1 comprised between T/10 and T/5 (these straight lines D1 and D2 are secant and make said angle a0 at the apex ranging from 60 to 110°, better still from 70° to 110°, even from 80° to 100° and even of 90°±5°, 90°±2 or of 90°).

Furthermore, to preserve the collimation function:
  air is between the exit surface (which is smooth or already textured in order to promote light extraction, such as with a lenticular array, etc.) and the entrance face (which is smooth, without coating, without micron-sized texture . . . ) of the first optical film of the collimation optic
  in particular the first optical film (single film or the set of films) being spaced apart from the exit surface by at most 1 mm or fastened on its periphery for example by adhesive bonding—with or without a spacer—, or optionally makes physical (non-optical) contact with the exit surface,
  for b) and c) air is between said prisms of the front face of the collimation optic (and even between the features of the front face of the single film, between the features of the first front face and between the features of the second front face), the apexes of the features of the front face of the collimation optic (front face of the single first film, of the second film and even of the first film of the set) being free or making physical contact with a transparent element (optical film, protective and/or (bi)functional film, second glazing of a laminated glazing . . . ) in particular of thickness that is preferably subcentimeter-sized and even of at most 0.5 mm or 0.3 mm for a) the two-dimensional features are recessed, the film includes an array of cavities corresponding to the two-dimensional features (the wall of each cavity forming the flank in particular the secant lateral faces or the conical flank), the apexes S are oriented toward face F2, and the top surface of each cavity (in particular defining the outline of the base) is free or makes physical contact with a transparent element in particular of thickness that is preferably subcentimeter-sized and even of at most 0.5 mm or 0.3 mm, air is in the cavities or for a) the two-dimensional features are raised, the apexes of the features of each front face are free or make physical contact with a transparent element of thickness that is subcentimeter-sized and even of at most 0.5 mm or 0.3 mm, air is between the two-dimensional features.

The collimation optic allows lighting to be increased and/or the lighting per reading zone to be better managed, between front or back passengers.

The one or more optical films according to the invention are effective, simple to implement and may be compact.

According to the invention, to guarantee their effectiveness, any even transparent material (adhesive, lamination interlayer) is avoided between the features of each film and in particular an air gap is created between the exit surface and the entrance face of the first optical film. Peripheral fastening for example with an adhesive may suffice to create this air gap.

A physical contact (film against exit surface) is tolerated but an air-filled cavity achieved by a peripheral fastening (preferably by adhesive bonding) with or without spacer is preferred (better controlled thickness, less risk of iridescent zones).

According to the invention, the (even each) peripheral fastening is preferably entirely outside (offset from, therefore peripheral to) the light-emitting area. The width of the fastening may be at most 5 mm.

Here are the numerical values of the increase in luminance (in the direction normal to the surface) observed with a light-emitting element that is an OLED covered with one or two prismatic films compared with a prismatic film with an optical adhesive to the OLED:
  a single optical film according to b) with an air gap: +40%
  two crossed optical films according to c) with air gap: +64%
  an optical film with an optical adhesive (counterexample): +6%.

The light-emitting element is preferably a (quasi-) Lambertian source. It is an extended source as opposed to point-like sources such as the inorganic light-emitting diodes referred to as LEDs.

For a reading-light function a minimum width and a minimum length are preferably set for the light-emitting element.

The light-emitting element such as an OLED or QLED may already have adhesively bonded to its exit surface a film with a lenticular array or equivalent for extracting the light (often called an EEL, for "external extraction layer") or an exit surface textured for this purpose.

The surface of the light-emitting element may be of any shape: polygonal, square, rectangular or round. Preferably, the light-emitting area is a single active area or a set of elementary active areas preferably of length of at least 1 or 2 cm that are arranged, spaced apart so as to produce uniform light for example in a square or rectangular strip.

The single active area is preferably rectangular or square. The elementary active areas are preferably square or rectangular.

Pointed features with planar faces are preferred but a manufacturing defect may lead to undulated features (curved flank and rounded apex). These features are acceptable such as delimited according to the invention.

Naturally, it is preferred for b) or c) to form a set of prismatic features that are one-dimensional along the longitudinal axis. If for manufacturing reasons the one-dimensional prism is divided into pieces in the length direction then the pieces are spaced apart by a distance smaller than <5 L better still than 10 L or than 20 L.

The features (prism or two-dimensional features) are as close as possible to one another and for example their bases are separated by less than 1 mm and preferably by less than 0.5 mm.

More preferably, the two-dimensional or prism features are contiguous or essentially contiguous.

Features are said to be contiguous when they touch each other in at least one portion of their surface. It is preferable for the features to be contiguous because they are thus more numerous and effective. For example, for each prismatic film, there is one set of prismatic features that are one-dimensional along the longitudinal axis, the bases of which features are contiguous.

Certain two-dimensional features do not allow complete contiguousness between the features. This is in particular the case when if the bases are circles, even if they touch, there remains a certain area between the circles not belonging to the features. By complete contiguousness, what is meant is the fact that the outline of the base of a feature also in its entirety forms part of the outlines of the neighboring features thereof.

Certain features may be completely contiguous, so that the entirety of the area (at least the functional area facing the light-emitting element) of the optical film forms part of at least one feature. It is a question of a tessellation. In particular, two-dimensional features with square or rectangular or hexagonal bases may be completely contiguous if they the bases are identical. In the case of square or rectangular bases, said bases should also be aligned if the features are to be completely contiguous. In the case of hexagonal bases, it is advisable for said bases to form a honeycomb.

Each textured transparent film covering the light-emitting element (preferably the OLED or QLED) may be textured 0, and therefore comprise one or more textured regions, directly opposite an (OLED or QLED) light-emitting element or a plurality of (OLED or QLED) light-emitting elements, and the adjacent regions (offset from the OLEDs or QLEDs) are smooth (in order to leave some transparency).

Preferably the collimation optic does not extend beyond the edge face of the first glazing.

When the roof includes a plurality of light-emitting elements such as OLEDs or QLEDs it may preferably include one collimation optic per (OLED or QLED) light-emitting element or a collimation optic that is common to a plurality of (OLED or QLED) light-emitting elements. The collimation optic is preferably as local as possible because it generates haze. In case of a common collimation optic the one or more optical films may be smooth between the light-emitting elements or with the features but over a smaller width of the one or more films, for example of at most 5 cm and even 1 cm.

Preferably, for the optical films according to the invention, it is preferably a question of repetitive features, i.e. geometric features having substantially the same shape and placed at substantially equal distance from one another and even of substantially the same height.

Of course, the shape of the zone covered by the collimation optic is independent of the shape of the features.

A two-dimensional feature may therefore be:
raised and therefore solid, for example with a conical or pyramidal surface, and in particular with secant lateral faces separated by lateral ridges,
recessed (in other words inverted)—the film is textured with an array of cavities, the one or more walls of each cavity forming the pyramidal lateral faces or the conical flank; the apex is oriented toward the face F2 and the top surface of the cavity defines the outline of the base.

The two-dimensional features for example end in a tip, such as is the case for a cone or a pyramid.

Preferably, each two-dimensional feature has the planar and secant (lateral) faces of a pyramid. If a two-dimensional feature is a regular pyramid, the base (comprised in the general plane of the textured face of the film) is an equilateral triangle.

A conventional cone does not have any planar surfaces on its flank.

The dimensions of the features are preferably about 10 μm to 500 μm and better still between 100 and 300 μm and preferably at least 50 μm in size.

The height of each optical film (collimation optic) may be comprised between 6 or 60 μm and 1 mm, preferably between 10 μm and 500 μm, and in particular between 20 and 300 μm, preferably at least 50 μm and even at most 300 or 200 μm.

The entrance of each optical film has a low roughness so as to prevent any scattering. Independently of the roughness, it is possible to define a feature (texture) depth or height that is equal to the distance between the highest point and the lowest point of a feature.

The transparent optical film may be a film made of plastic material (organic polymer) and in particular thermoplastic material and preferably made of polyester, polyethylene terephthalate PET, polyethylene PE polycarbonate PC, polymethyl methacrylate PMMA, polystyrene, polyamide, polydimethylsiloxane PDMS, polyethylene naphthalate PEN, polyimide, polycrylates, polysulfones, polyethersulfones, or (thermoplastic) polyurethane.

The transparent optical film is preferably flexible in order to match the one or more curvatures of the (monolithic or laminated) glazing if it is curved.

The optical film may comprise a plastic film with, on its surface, a transparent layer with said features, the thickness of said layer being partially or entirely textured.

Preferably, each optical film is a (monolithic) plastic film the thickness of which is partially textured; in other words there is a constant thickness between the smooth entrance face and the closest point of the textured front face (interior side). Preferably, the remaining (constant) thickness of the film is defined as the distance between the lowest point between the textured front face and the rear face. The remaining thickness is at least 50 μm and even at most 200 μm.

The texture may be produced by rolling (i.e. cast), thermoforming, etching and in particular laser etching for a polymer material. Depending on the shape of the desired texture, the manufacture may not necessarily lead to perfect geometric shapes: rounded valley or apex, etc.

The collimation optic according to a) or c) may be a first textured transparent film. The collimation optic according to c) may be a first textured transparent film and a crossed second textured transparent film.

Preferably, regarding the collimation optic, the following preferably cumulative features are preferred:
the or each optical film is a plastic film that is partially textured in its thickness
for a) the two-dimensional features are recessed, the plastic film in particular being partially textured in its thickness; the two-dimensional features have a rectangular, square or circular base and preferably have a height H with a dispersion of at most 10%; the features are in particular (almost) of the same height and therefore have top surfaces in the same plane
for a), b) or c) the angle a0 is 90°±2° and even the angle a1 and/or a2 is 45°±2°. The light-emitting element and its collimation optic form a reading light.

The reading light may be placed above the location of the passenger compartment to be illuminated or it may be necessary or desired to place the reading light adjacent, offset from this location.

Furthermore, in one embodiment, the roof furthermore comprises, facing the collimation optic, preferably on the front face of the collimation optic (fastened on its periphery, for example adhesively bonded or welded, or spaced apart therefrom by at most 1 mm) a redirection optic, the collimation optic is between the light-emitting element and the redirection optical film, made of transparent material that is preferably plastic (in particular thermoplastic, polyester, PET, polyethylene PE polycarbonate PC), which is preferably of submillimeter-sized thickness E' 1, includes a redirection optical film or a set of redirection optical films each including an array of asymmetric prisms with apexes and with a pitch T' between apexes that is from 10 μm to 500 μm, preferably with at least 4 or even 10 features facing the exit (or light-emitting) surface, the redirection optic thus preferably includes:

i) a first optical film that is asymmetric prismatic with, on a main face opposite to the exit surface called the final front face, said array of asymmetric prisms extending longitudinally along a third axis making an angle of at most 10°, at most 5° or at most 2° to said first axis and even parallel and/or to the reference direction of the glazing (the horizontal between the front and rear) and even is parallel, in particular with a thickness that is submillimeter-sized and even of at most 0.3 mm or 0.2 mm or 0.15 mm j) or a set of two asymmetric optical films that are prismatic, including in this order starting from the exit surface:
a first asymmetric optical film with on a main face opposite to the exit surface (called the intermediate face) an array of asymmetric prisms, extending longitudinally along a third axis, in particular with a thickness that is submillimeter-sized and even of at most 0.3 mm or 0.2 mm or 0.15 mm
and facing the first asymmetric optical film (preferably spaced apart therefrom by at most 1 mm or fastened to its periphery for example adhesively bonded or welded) a second optical film in particular with a thickness that is submillimeter-sized and even of at most 0.3 mm or 0.2 mm or 0.15 mm, with on a main face opposite to the exit surface, called the final front face, with a second array of prismatic features—which array is crossed with the first array of prismatic features—, extending longitudinally along a fourth axis (X) making an angle to said third axis of at most 10°, preferably of at most 5°, at most 2° and even of 0° (parallel, the third and the fourth axis each makes an angle to the reference direction (and even the first axis), of at most 10°, of at most 5° or at most 2° (or) 0°.

For i) and j) each asymmetric prism is defined by first and second longitudinal faces, the prism preferably having a length L and a width W with L>2 W and better still >5 W or >10 W.

Each asymmetric prism has an angle at the apex a'0 ranging from 50 to 60° better still of 55°±5° or 55°±2° and the first longitudinal face (called the long side) makes to the plane of the film a first angle a3 ranging from 31 to 41° better still of 35°±5° or 35°±2° (naturally the second longitudinal face (called the short side) makes to the plane of the film a second angle a4, ranging from 79 to 99° better still from 85 to 90° or 88 to 90°, and preferably of at most 90°. Preferably, the difference between a4–a3 is larger than 40° and even than 50°.

In particular, for i) and j):

all or some of the asymmetric prisms being pointed with the two longitudinal faces planar and secant at the apex S1 each pointed prism being defined by said angle at the apex a'0 all or some of the as(s)ymmetric prisms being rounded with the two longitudinal faces (each curved or at least partially curved optionally with a planar portion then curved toward the apex), in a plane P normal to the plane of the film and normal to said axis of the prism, the intersection between the plane P and each rounded prism forms a section including two curves C'1, C'2 that are contiguous to the apex S1, first and second straight lines D'1 and D'2 passing through the inflection points I'1 and I'2 of the two curves C'1, C'2 are defined, a first straight line D'1 making said angle a3 to the plane of the redirection optical film, a second straight line D'2 making said angle a4 to the plane of the redirection optical film, each rounded asymmetric prism being defined by a circle tangent to the apex S1 with a radius of curvature R1 comprised between T'/10 and T'/5 (these straight lines D'1 and D'2 are secant and make said angle at the apex a'0).

When the asymmetric prisms are contiguous, valleys —which are pointed or rounded—are defined with the same tolerances in the angle in the valley as in the angle at the apex described above and in the optional radius of curvature in the valley.

Furthermore the normal to the long side is directed toward the interior side and oriented in such a way as to be toward the side opposite to the desired deviation.

The assembly consisting of the collimation optic and optional prismatic redirection optic according to the invention operates in that same way in all the visible, contrary to a holographic film, which will generate iridescence.

Preferably, with respect to the light-emitting element, the following preferably cumulative features are preferred:

the light-emitting element is an organic light-emitting diode, i.e. a so-called OLED, in particular a transparent organic light-emitting diode (TOLED) or a quantum-dot light-emitting diode, i.e. a so-called QLED the light-emitting element, in particular an OLED or QLED, is transparent, and has a light transmittance of at least 20% and even of at least 50%.

the light-emitting element is a back-emitting OLED including a carrier (that is transparent or opaque or with an opaque layer) that bears, face-F2 side, in this order starting from the carrier: an optional functional underlayer, a transparent anode, an organic light-emitting system, a reflective cathode, in particular with on the surface face-F2 side, and even one or more dark edges adjacent to the luminous area (for example technical edges, for the electrical power supply) for example of width that is subcentimeter-sized of at most 1 cm even of at most 5 mm or 1 mm, the collimation optic being fastened (adhesively bonded or even welded, etc.) preferably at least partially facing the technical edges.

The OLED may also comprise an encapsulation layer covering the assembly (the active area): resist that is for example transparent or even adhesive-coated plastic film, this plastic film equipped with electrically conductive zones may serve for the electrical connection.

The light-emitting element may be masked from the exterior by a masking layer (enamel, etc.) on face F1 or F2. The light-emitting element on an internal masking layer on face F2. The light-emitting element may be opaque The collimation (or even redirection) optic in a laminate may be against face F3 without fastening (adhesive bonding, etc.)

Preferably, the set of optical films has a thickness of at most 1 mm or of at most 0.6 mm and even the assembly consisting of the light-emitting element and the optical films has a thickness of at most 1 mm or of at most 0.6 mm.

The roof may comprise a laminated glazing including:
said first (transparent) glazing,
a second (transparent) glazing, intended to be the interior glazing, which is made of preferably curved and preferably clear or extra-clear or even tinted (less than the first glazing) mineral or even organic glass, with third and fourth main faces, face F3 and face F4, respectively, for a motor vehicle, preferably of thickness smaller than that of the first glazing, even of at most 2 mm—in particular 1.9 mm, 1.8 mm, 1.6 mm and 1.4 mm—or even of at most 1.3 mm or of less than 1.1 mm or even of less than 0.7 mm and in particular of at least 0.2 mm, the total thickness of the first and second glazings preferably being strictly smaller than 4 mm, and even than 3.7 mm, the second glazing possibly being chemically toughened
between the faces F2 and F3, which are the internal faces of the laminated glazing, a transparent lamination interlayer that is optionally clear, extra-clear or even tinted in particular gray or green (partially tinted in its thickness if a multilayer for example), made of polymeric material and preferably thermoplastic and even better still made of polyvinyl butyral (PVB), this lamination interlayer (single sheet, composite sheet) having a main face FA face-F2 side and a main face FB face-F3 side.

In a region that is offset from, in particular adjacent to, the light-emitting element, which is in particular an OLED or QLED, said region for example covering at least 50% and even 80% or 90% of the area of the roof) the face FA makes adhesive contact with face F2 (which is bare or coated with a coating) and the face FB makes adhesive contact with face F3 (which is bare or coated with a coating) said OLED or QLED in particular, in particular the light-emitting element, in particular the light-emitting element, in particular an OLED or QLED, being between the faces F2 or F3 and the collimation optic and the asymmetric redirection optic preferably being between faces F2 or F3 or the light-emitting element, in particular an OLED or QLED, on face F4 and preferably the asymmetric redirection optic is face-F4 side or preferably the collimation optic and the asymmetric redirection optic are face-F4 side The lamination interlayer is of thickness $E_A$, in particular between face FA and FB, —which for a motor vehicle—is preferably of at most 1.8 mm, better still at most 1.2 mm and even of at most 0.9 mm (and better still of at least 0.3 mm and even of at least 0.6 mm), in particular set back from the edge face of the first glazing by at most 2 mm and in particular set back from the edge face of the second glazing by at most 2 mm, in particular being an acoustic and/or tinted first sheet.

The lamination interlayer, formed from one or more sheets —one between the face FA and FB and/or a sheet on the back face and/or even a sheet between the face FB and the face F3—may preferably be made of polyvinyl butyral (PVB), or even of polyurethane (PU), of ethylene vinyl acetate copolymer (EVA), and for example has a thickness of between 0.2 mm and 1.1 mm. The lamination interlayer may optionally be composite in its thickness as detailed below (PVB/plastic film such as polyester, PET etc./PVB).

It is possible to choose a conventional PVB such as RC41 from Solutia or Eastman.

The lamination interlayer (central sheet and/or rear sheet and/or front sheet) may comprise at least one what is called central layer made of viscoelastic plastic with vibro-acoustic damping properties, in particular based on polyvinyl butyral (PVB) and plasticizer, and the interlayer, and furthermore comprising two external layers made of standard PVB, the central layer being between the two external layers. Mention may be made, as an example of an acoustic sheet, of the patent EP 0 844 075. Mention may be made of the acoustic PVBs described in the patent applications WO2012/025685, WO2013/175101, in particular tinted as in WO2015079159.

The lamination interlayer (central sheet and/or rear sheet and/or front sheet) may include an acoustic PVB and/or is (a PVB that is) tinted, the lamination interlayer in particular in particular is a PVB that is at least partially tinted in its thickness. The tinted portion may be at least (and even at most) between the light-emitting element (OLED, QLED . . . ) and face F2.

A laminated glazing according to the invention may be with:
  the first glazing made of mineral glass, the second glazing made of mineral glass that is for example thinner
  the first glazing made of mineral glass, the second glazing made of organic glass that is for example thinner (PET, PC, PMMA, etc.) optionally with a protective overlayer on face F4 ('hard coat').

The collimation optic and/or the optional redirection optic may be on face F4 whereas the light-emitting element (OLED, QLED . . . ) is between face F2 and F3. Otherwise, the collimation optic is with the light-emitting element in the laminate or on face F4 and the optional redirection optic on face F4 or the collimation optic and the optional redirection optic is with the light-emitting element in the laminate or on face F4.

The light-emitting element (OLED, QLED . . . ) alone or with the collimation optic may have a thickness E0 that is too large to be laminated, via an interlayer sheet or between two interlayer sheets.

In particular, the light-emitting element (OLED, QLED . . . ) may be housed in an aperture of the lamination interlayer and even the collimation optic is housed in said aperture (and even fastened for example adhesively bonded to the light-emitting element), the aperture is blind with a bottom in the direction of the face F2 and emerges onto face F3, or the aperture is a so-called internal aperture and is in the thickness of the lamination interlayer and said transparent element is a protective film (which is optionally functional: with an electrically conductive layer, heating layer, solar-control or low-emissivity "low-E" layer and/or a layer that forms a capacitive touch switch for turning on the light-emitting element), housed in said internal aperture or larger than said internal aperture and covering said internal aperture The aperture is useful in particular when E0 (or E0+E1 if collimation optic housed) is larger than 0.15 mm. The aperture of the lamination interlayer facilitates installation, integration and improves performance.

Completely unexpectedly, in the case of an emergent aperture the interlayer does not flow enough to adversely affect the operation of the collimation optic. In particular, placement under vacuum presses the collimation optic against face F3.

Preferably, the light-emitting element (OLED, QLED . . . ) and the collimation optic are in apertures (preferably) of a PVB or of a PVB/functional film with an optional functional coating/PVB.

Preferably, the roof has at least one of the following features:
  the aperture is in a thickness of PVB (one or more sheets, the interface(s) of which are in particular discernible)
  the aperture is in an in particular three-layer or four-layer acoustic lamination interlayer
  the aperture is in a tinted lamination interlayer
  the aperture is in a composite (multisheet) material: PVB/transparent plastic film or even PVB/transparent plastic film/PVB, said plastic film, in particular a polyester or a PET, of thickness that is submillimeter-sized and even at most 0.2 mm or at most 0.1 mm bearing a functional coating: providing a low emissivity or solar control function and/or even a heating function.

Naturally, the lamination interlayer (a PVB sheet) may make direct contact with the face F3 or with a conventional functional coating on this face, in particular a stack of thin layers (including one or more silver layers) such as: a heating layer, antennae, a solar-control or low-emissivity layer or a decorative or (opaque) masking layer such as a generally black enamel.

Naturally, the lamination interlayer (a PVB sheet) may make direct contact with the face F2 or with a conventional functional coating on this face, in particular a stack of thin layers (including one or more silver layers) such as: a heating layer, antennae, a solar-control or low-emissivity layer or a decorative or (opaque) masking layer such as a generally black enamel.

The glass, preferably the internal glass in a laminated glazing, which in particular is thin and of thickness smaller than 1.1 mm, is preferably chemically tempered. It is preferably clear. Mention may be made of the examples of patent applications WO2015/031594 and WO2015066201.

Preferably, regarding the fastening of the collimation optic, the following solutions are preferred:
  the collimation optic is fastened (and preferably adhesively bonded or even welded, etc.) to the light-emitting element (OLED, QLED . . . ), via its rear face, in particular by an adhesive (glue, double-sided adhesive) that is preferably transparent (on the periphery of the exit surface,
and/or the collimation optic is fastened and preferably adhesively bonded or even welded, etc.) to the transparent element (protective film, second glazing, etc.), in particular by an adhesive (glue, double-sided adhesive) that is preferably transparent on the periphery of the front face
or
  in the case of the laminated glazing described above, the collimation optic is larger than the light-emitting element (OLED, QLED . . . ) and is fastened on its periphery (preferably adhesively bonded or even welded, etc.) in particular by a preferably transparent adhesive to or even on its periphery makes adhesive contact (without addition of material) via its rear face with said lamination interlayer (central sheet, in particular PVB).

An adhesive (glue, double-sided adhesive) that is transparent is preferred if the adhesive is in the vision area. It is possible to choose another fastening means such as a weld (forming a local adhesive contact without addition of material).

The adhesive bonding (glue, double-sided) between collimation optic and exit surface and/or between optical films or even between optical film and protective film may be frame-like and form a seal.

In the case of a plurality of optical films (case b) with the two prismatic films crossed, the optical films may be fastened together on their periphery for example adhesively bonded in particular by an adhesive (glue, double-sided adhesive) that is preferably transparent or simply one against the other (contact via the apexes of one film on the rear of the other film).

In one example of a laminated glazing, the collimation optic is between face F2 and F3, the light-emitting element (OLED, QLED . . . ) is between face F2 and F3 and in the zone with the light-emitting element, the face FA makes adhesive contact with face F2 and optionally the face FB makes adhesive contact with the entrance surface, the transparent element being the (bare or coated) second glazing In one example of a laminated glazing, the collimation optic is between face F2 and F3, the light-emitting element (OLED, QLED . . . ) is between face F2 and F3 and in the zone with the light-emitting element the face FA makes adhesive contact with face F2 or on the side of the exit surface (front lamination interlayer), and the face FB makes adhesive contact with the face F3 and the transparent element is a protective film that is plastic in particular polyester, in particular PET, PC) for example of submillimeter-sized thickness E4, on the front face, with a face (F6) oriented toward the face F3 and in adhesive contact with the lamination interlayer (and with a face (F5) that is oriented toward the face F2 against the front face while leaving air in the cavities or between the —raised—features).

The plastic protective film is local optionally with a so-called extension zone extending beyond the edges of the front face (of the collimation optic) by at most 10 cm, even by at most 5 cm or 1 cm, in particular with the extension in adhesive contact with the lamination interlayer.

The (local or covering) transparent protective film may be a film made of plastic material (organic polymer) and in particular thermoplastic material and preferably made of polyester, polyethylene terephthalate PET, polyethylene PE polycarbonate PC, polymethyl methacrylate PMMA, polystyrene, polyamide, polydimethylsiloxane PDMS, polyethylene naphthalate PEN, polyimide, polycrylate, polysulfone, polyethersulfone, or (thermoplastic) polyurethane. It is for example of the same material as the collimation and/or redirection film.

The lamination interlayer may be composite and includes the following stack outside of the zone of the light-emitting element (OLED, QLED . . . ): PVB/in particular polyester, PET (among other of the aforementioned plastics) functional plastic film with an optional electrically conductive functional coating face-F2 or face-F3 side/PVB, the functional plastic film, which is preferably of submillimeter-sized thickness E'4, extending over face F2, and the light-emitting element (OLED, QLED . . . ) is between the face F2 and F3, between the front face and face F3 is present said plastic film/said PVB, the transparent element is the functional plastic film on the front face.

The local protective film for example covers at most 20% or at most 10% or 5% of the area of the glazing. In particular, the collimation optic and the front protective film may be of same size (and even of same size as the light-emitting element (OLED, QLED . . . ) or set back from the edge face covering at least the active area)) or the area of the front protective film is larger and preferably does not extend beyond the edge face of the collimation optic by more than 10 cm or even more than 5 cm or more than 1 cm.

Alternatively, the (front) protective film may cover at least 30%, 50%, 80%, or 90% of face F2 or for example be set back by at most 5 cm and even by at most 1 cm or by at most 5 mm from the edge face of the first glazing. Preferably it bears a low-emissivity or solar-control and/or even heating functional coating in particular covering at least 80% or 90% of face F2.

The front protective film may be functional: with a layer that is electrically conductive and functional: heating layer, solar-control or low-E layer and/or layer that forms a capacitive touch switch for turning on the light-emitting element (OLED, QLED . . . ). The local protective film may be clear or extra-clear.

The local protective film may be functional: with a layer that is electrically conductive and functional and that in particular forms a capacitive touch switch for turning on the light-emitting element (OLED, QLED . . . ). The local protective film may be clear or extra-clear.

With respect to the location of the light-emitting element (OLED, QLED . . . ) and its collimation optic):

face F2 may be free, the glazed roof is monolithic for example made of glass, PMMA, PC, the light-emitting element is on face F2 (and the collimation optic on or spaced apart from the light-emitting element) or if the glazing is laminated and the light-emitting element is on the free face F4, the collimation optic is fastened on its periphery, in particular adhesively bonded, to the light-emitting element) on the periphery of the exit surface, via its rear face, in particular by a preferably transparent adhesive (glue, double-sided adhesive) and/or the assembly consisting of the light-emitting element/collimation optic is fastened on its periphery, in particular adhesively bonded, preferably by a preferably transparent adhesive (glue, double-sided adhesive) to the free face F4 or F2 via a front protective film (tacky, etc.) that is said transparent element with a fastening portion protruding onto the free face F4 or F2 and/or the light-emitting element is fastened, preferably adhesively bonded, via its entrance surface to the free face F4 or F2 (and the collimation optic on or spaced apart from the light-emitting element).

The front protective film may have another function. It may be tinted, and/or bear an electrically conductive (solar-control, low-E, etc.) coating in particular covering at least 80% or 90%.

The front protective film in particular covering at least 80% or 90% of face F2 may be composite via a PET with a protective overlayer (so-called "hard coat").

The (local or covering) front transparent protective film may be a film made of plastic material (organic polymer) and in particular thermoplastic material and preferably made of polyester, polyethylene terephthalate PET, polyethylene PE polycarbonate PC, polymethyl methacrylate PMMA, polystyrene, polyamide, polydimethylsiloxane PDMS, polyethylene naphthalate PEN, polyimide, polycrylate, polysulfone, polyethersulfone, or (thermoplastic) polyurethane. It is for example of the same material as the collimation and/or redirection film.

Preferably, the thickness of the assembly consisting of the collimation optic and even of the optional redirection optic is at most 1 mm even 0.9 mm or 0.6 mm.

In the case of fastening to a free face F2 or F4, in order to avoid extra thickness on the free face F2 or F4, E0 is of at most 1 mm and even of at most 0.5 mm.

Preferably when the light-emitting element (OLED, QLED . . . ) is between faces F2 and F3, in order to avoid an extra thickness of lamination interlayer, E0 is of at most 1 mm and even of at most 0.5 mm.

Whatever its location (on face F2 or free face F4 or between F2 and F3 of a laminated glazing) the light-emitting element (OLED, QLED . . . ) may be local and for example cover at most 20% or at most 10% or even at most 5% of the area of the glazing and/or the collimation optic may be local and for example cover at most 20% or at most 10% or 5% of the area of the glazing. In particular, the light-emitting element (OLED, QLED . . . ) and the collimation optic may be of same size or set back from the edge face (covering at least the active area) or the area of the collimation optic is larger and preferably does not extend beyond the edge face of the light-emitting element (OLED, QLED . . . ) by more than 10 cm even more than 5 or more than 1 cm.

The (front) protective film may be local and for example cover at most 20% or at most 10% or 5% of the area of the glazing. In particular, the collimation optic and the front film may be of same size (and even of same size as the light-emitting element or set back from the edge face covering at least the active area)) or the area of the front film is larger and preferably does not extend beyond the edge face of the collimation optic by more than 10 cm or even more than 5 cm or more than 1 cm.

Alternatively, the front protective film may cover at least 30%, 50%, 60%, or 90% of face F2 (for example set back by at most 10 cm even at most 5 cm or 1 cm from the edge face of the first glazing). For example, it bears a low-emissivity or solar-control and/or even heating functional coating.

An element for electrically connecting said light-emitting element may be connected to said light-emitting element and extend beyond the edge face of the glazing.

An electrically connecting element that is preferably flexible may be fastened (adhesively bonded, welded, etc.) or pressed against the light-emitting element (OLED, QLED . . . ), the electrically connecting element preferably extending beyond the edge face of the glazed roof. It is for example of thickness E'0 that is of at most 0.2 mm or of at most 0.15 mm and even of at most 0.1 mm.

The electrically connecting element (strip or wires) may be connected to the light-emitting element (OLED, QLED . . . ) in one (or more than one) peripheral zone of the entrance or exit surface.

In one embodiment, the electrically connecting element is an assembly of two metal wires or metal strips.

In one embodiment, the electrically connecting element is a strip (flat connector) that includes a film made of a preferably transparent plastic material, preferably polyester, polyethylene terephthalate or PET or of polyimide, provided with conductive tracks that are in particular metal (copper etc.) or made of transparent conductive oxide.

The conductive tracks are printed or deposited by any other deposition method, for example physical vapor deposition. The conductive tracks can also be wires. It is preferable for the conductive tracks and the film to be transparent when they are visible, that is to say when they are not masked by a masking element (layer) (such as an enamel, indeed even a paint, and the like), in particular on face F4 or F3. The conductive tracks can be transparent due to the transparent material or due to their width, sufficiently thin to be (virtually) invisible.

Polyimide films have a higher temperature withstand than the alternative PET or even PEN (polyethylene naphthalate) films.

The electrically connecting element may be (entirely or partially) in the vision area of the roof and optionally spaced apart from opaque peripheral strips (even forming an opaque frame), such as strips of a (black, dark, etc.) masking enamel. Most often, there is an opaque layer on face F2 and if a laminate an opaque layer on face F4, indeed even F3. Their widths are identical or distinct.

The width Li of an opaque peripheral strip on face F2 and/or F3 and/or F4 is preferably at least 10 mm and even 15 mm. Thus, the length of the electrically connecting element may be larger than Li.

The electrically connecting element may be arranged in or in the vicinity of the region of an opaque layer, in particular a (black) enamel, along a peripheral edge of the laminated glazing, generally on face F2 and/or face F4 or also on face F2 and/or on face F3.

Thus, in a first embodiment, the electrically connecting element may even be placed in a region of the roof in which the exterior glass is entirely (or partially) opaque because of the presence of an opaque layer (the most external opaque layer), such as a layer of (black) enamel, on F2. This opaque layer may, in this region of the roof, be an unapertured layer (continuous background) or a layer with one or more discontinuities (areas without opaque layer), said layer for example taking the form of a set of optionally geometric (circular, rectangular, square etc.) patterns that are of identical or distinct size (of size that decreases with distance from the edge face and/or the patterns getting further and further apart with distance from the edge face).

In this first embodiment, the light-emitting element, such as the OLED or QLED, and the electrically connecting element may be visible only from the interior and therefore masked by the opaque layer on face F2.

The electrically connecting element may be placed in a region of the roof, in which region the interior glass is opaque because of the presence of an opaque layer (the most internal opaque layer), such as a layer of (black) enamel, preferably on F4 or even on F3. The light-emitting element, such as the OLED or QLED, may be placed in this region of the roof, this opaque layer then includes an aperture (produced via a mask during deposition or by removal in particular with a laser) plumb with the light-emitting element.

The light-emitting element is suitably placed in the front as in the rear of the vehicle for example along a longitudinal or lateral edge of the roof. A reading light facing each seat is preferred.

In case of a plurality of light-emitting elements they may be connected in series or in parallel and/or independently. Two light-emitting elements may be on a common element that serves for the electrical connection.

Two light-emitting elements may be separated and connected together by an electrically connecting element that preferably is as discreet as possible, for example wires or a transparent flat connector.

In one embodiment of the vehicle, it includes at least one control unit for driving the light-emitting element (such as an OLED or QLED) and even at least one sensor, in particular for detecting luminosity. A control unit for driving the (each) light-emitting element (OLED or QLED) may be in the laminated glazing (on the first glazing or the second glazing) or on the first glazing.

Preferably, the glazed roof according to the invention meets current motor-vehicle specifications in particular with respect to light transmittance $T_L$ and/or energy transmittance $T_E$ and/or energy reflectance $R_E$ and/or even with respect to total solar transmittance TST.

For an automobile roof, one or more of the following criteria are preferred:
- $T_E$ of at most 10% and even from 4 to 6%;
- $R_E$ (preferably face-F1 side) of at most 10%, better still from 4 to 5%;
- and TTS<30% and even <26%, even from 20 to 23%.

The TL may be low, for example at most 10% and even from 1 to 6%.

In order to limit heating of the passenger compartment or to limit the use of air conditioning, the first glazing or one of the glazings at least (preferably the exterior glass) is tinted. Furthermore, the glazing, which is in particular laminated, may also include a layer that reflects or absorbs solar radiation, preferably on face F4 or on face F2 or F3, in particular a layer of transparent electrically conductive oxide, i.e. what is called a TCO layer, or even a stack of thin layers comprising at least one TCO layer, or stacks of thin layers comprising at least one silver layer (on F2 or F3 preferably for a laminated glazing), the or each silver layer being placed between dielectric layers.

It is possible to simultaneously have a (silver-containing) layer on face F2 and/or F3 and a TCO layer on face F4.

The TCO layer (of a transparent electrically conductive oxide) is preferably a layer of fluorine-doped tin oxide ($SnO_2$:F) or a layer of mixed indium tin oxide (ITO).

Other layers are possible, including thin layers based on mixed indium zinc oxides (referred to as "IZOs"), based on gallium-doped or aluminum-doped zinc oxide, based on niobium-doped titanium oxide, based on cadmium or zinc stannate, or based on antimony-doped tin oxide. In the case of aluminum-doped zinc oxide, the doping level (that is to say, the weight of aluminum oxide with respect to the total weight) is preferably less than 3%. In the case of gallium, the doping level can be higher, typically within a range extending from 5 to 6%.

In the case of ITO, the atomic percentage of Sn is preferably within a range extending from 5 to 70% and in particular from 10 to 60%. For layers based on fluorine-doped tin oxide, the atomic percentage of fluorine is preferably at most 5% and generally from 1 to 2%.

ITO is particularly preferred, especially with respect to $SnO_2$:F. Of higher electrical conductivity, its thickness can be smaller to obtain one and the same emissivity level. Easily deposited by a cathode sputtering process, in particular a magnetron cathode sputtering process, these layers are characterized by a lower roughness and thus a lower tendency to foul.

One of the advantages of fluorine-doped tin oxide is, on the other hand, its ease of deposition by chemical vapor deposition (CVD), which, contrary to the cathode sputtering process, does not require a subsequent heat treatment and can be implemented on the float plate-glass production line.

The term "emissivity" is understood to mean the normal emissivity at 283 K within the meaning of the standard EN12898. The thickness of the low-emissivity (TCO, and the like) layer is adjusted, depending on the nature of the layer, so as to obtain the desired emissivity, which depends on the sought—for thermal performance qualities. The emissivity of the low-emissivity layer is, for example, less than or equal to 0.3, in particular less than or equal to 0.25 or even less than or equal to 0.2. For layers made of ITO, the thickness will generally be at least 40 nm, indeed even at least 50 nm and even at least 70 nm, and often at most 150 nm or at most 200 nm. For layers made of fluorine-doped tin oxide, the thickness will generally be at least 120 nm, indeed even at least 200 nm, and often at most 500 nm.

For example, the low-emissivity layer comprises the following sequence: high-index underlayer/low-index underlayer/a TCO layer/optional dielectric overlayer.

It is possible to choose, as preferred example of low-emissivity layer (protected during a tempering, high-index underlayer (<40 nm)/low-index underlayer (<30 nm)/an ITO layer/high-index overlayer (5-15 nm))/low-index barrier overlayer (<90 nm)/final layer (<10 nm).

Mention may be made, by way of low-emissivity layer, of those described in the patent US2015/0146286, on the face F4, in particular in examples 1 to 3.

In a preferred embodiment:
- the first and/or second glazing is tinted and/or the lamination interlayer is tinted over all or some of its thickness
- and/or face F2 or face F3 or face F4—preferably face F4—of the glazed roof is coated with a low-emissivity layer, in particular one comprising a transparent electrically conductive oxide layer (i.e. what is called a TCO layer) and in particular a stack of thin layers containing a TCO layer or a stack of thin layers containing one or more silver layers
- and/or face F2 or face F3 or face F4—preferably face F3—of the glazed roof is coated with a solar-control layer, in particular one comprising a transparent electrically conductive oxide layer (i.e. what is called a TCO layer) and in particular a stack of thin layers containing a TCO layer or a stack of thin layers containing one or more silver layers
- and/or an additional tinted (polymeric, such as a polyethylene terephthalate PET, and the like) film is between the faces F2 and F3 or (bonded) on F4, indeed even on face F1.

In particular, the face F4 of the glazing is coated with a transparent functional, in particular low-emissivity, layer that preferably comprises a TCO layer comprising a zone (supplied with electricity, therefore an electrode) forming a touch button (for controlling the first luminous area).

A transparent (PET etc.) film bearing a functional layer face-F2 (or as a variant face-F3) side may form a capacitive touch switch. It may be a question of the protective film.

The invention of course relates to any vehicle and in particular to an automobile including at least one roof such as described above.

The invention also aims to achieve greater simplicity and/or to increase rates.

To this end, one subject of the invention is a manufacturing process including, before installation in the first glazing, pre-mounting on the light-emitting element of the film-based collimation optic or even of the film-based redirection optic and even of a protective film on the last redirection or collimation optical film, in particular by peripheral fastening and even by peripheral adhesive bonding optionally forming a seal.

To this end, the invention also proposes a process for manufacturing a luminous laminated roof such as described above that includes the following steps:

> positioning the light-emitting element, in particular the OLED, on (or even fastening to in particular by adhesive bonding preferably with a transparent adhesive or by creating adhesive contact by spot heating, etc.) an unapertured lamination interlayer sheet or in a through- or blind aperture and simultaneously or separately positioning the collimation optic facing the light-emitting element and even the optional redirection optic on the collimation optic and successively:

> installing the assembly positioned between the first and second glazing
>
> laminating under vacuum and with heating or even under pressure (and with heating), autoclaving for example.

Thus operations are carried out off the industrial lamination line.

The collimation optic and the light-emitting element, in particular an OLED, may be positioned on or even joined to (held in place by adhesive bonding, point adhesive contacts, etc.) a separate lamination interlayer sheet.

The assembly consisting of the collimation optic/light-emitting element, in particular an OLED, may be positioned on or even joined to (held in place by adhesive bonding, point adhesive contacts, etc.) a common lamination interlayer sheet, the collimation optic then being fastened and preferably adhesively bonded to the exit surface on its periphery.

Preferably, the through- or blind hole is of thickness $E_t$ of 0.3 to 0.9 mm with in absolute value E1-Et of at most 0.3 mm or Ei—sum of the OLED and optic(s) thicknesses of at most 0.3 mm.

The following may preferably be used:

> a first and only sheet with a blind hole, preferably optionally acoustic PVB
>
> a first (PVB) sheet with a through- and blind hole and a second unapertured (PVB) sheet, with hole of thickness $E_t$ of 0.3 to 0.9 mm, which is optionally acoustic and/or tinted with in absolute value E1-Et of at most 0.3 mm (Ei—sum of the OLED and optic(s) thicknesses of at most 0.3 mm)
>
> a first (PVB) sheet with a through- and blind hole between a second unapertured (PVB) sheet and a third unapertured (PVB) sheet.

In particular:

> the rear sheet F2 side is of optionally acoustic and/or tinted PVB of 0.3 to 0.9 mm thickness $E_i$
>
> and/or the optionally acoustic and/or tinted central sheet with through- or blind hole (of PVB) of thickness $E_i$ of 0.3 to 0.9 mm with in absolute value E1-Ei of at most 0.3 mm (Ei—sum of the thicknesses of the OLED and optic(s) of at most 0.3 mm) and even in absolute value E1-Et of at most 0.3 mm (Ei—sum of the thicknesses of the OLED and optic(s) of at most 0.3 mm)
>
> and/or the front sheet F3 side is of clear or extra-clear and optionally acoustic PVB of thickness $E_k$ of 0.3 to 0.9 mm.

The process may furthermore comprise or make provision:

> for the light-emitting element to be positioned on said lamination-interlayer sheet in a through- or blind aperture entrance-surface side, with the collimation optic and the optional redirection optic housed in the aperture and fastened, and preferably adhesively bonded, on the periphery of the exit surface or with the collimation optic or the optional redirection optic capping the aperture and on said lamination-interlayer sheet,
>
> for the light-emitting element, in particular the OLED, to be positioned on said unapertured lamination interlayer sheet using a positioning aid in particular an element on the side of (the opposite face of the lamination interlayer (sheet) and including a reference mark such as a nonstick element against this face or even an element such as a transfer on the opposite face of the transparent (glass etc.) assembly table
>
> for said (unapertured or apertured) interlayer sheet to be an optionally acoustic PVB sheet or to be a PVB/functional plastic film or PVB/functional plastic film/PVB composite (whether preassembled or not), the positioning being on the PVB or on the functional film, the functional film preferably being unapertured when the PVB is apertured
>
> before said positioning, to fasten, in particular by adhesive bonding, a local protective film to the front face of the collimation or optional redirection optic and during said positioning said lamination interlayer has a blind hole housing the local protective film or said lamination interlayer has a through-hole and another lamination interlayer closes the hole
>
> for said lamination interlayer to have a through-hole housing the light-emitting element, in particular the OLED, and the collimation optic and the optional redirection optic, the process including placing a protective film closing said hole and another interlayer sheet covering the protective film optionally already in adhesive contact with the protective film
>
> for point adhesive contact to be created by heating (and pressure) outside of the zone of the light-emitting element, in particular the OLED:
>
>> between said interlayer sheet and another so-called rear interlayer sheet entrance-surface side
>>
>> and/or between said interlayer sheet and another so-called front interlayer sheet exit-surface side,
>>
>> and/or between the collimation optic or optional redirection optic and the interlayer sheet or another interlayer sheet
>
> the light-emitting element, in particular the OLED, and even the collimation optic and even the optional redirection optic being in a through- or blind hole of one of said interlayer sheets and/or the light-emitting element and even the collimation optic and even the optional redirection optic being sandwiched between said interlayer sheet and the rear or front other interlayer sheet
>
> creating point adhesive contact by heating (and pressure) between the light-emitting element, in particular the OLED, and said interlayer sheet and/or said light-emitting element and another interlayer sheet.

To hold the light-emitting element and/or the collimation optic (which is not securely fastened to the light-emitting element, which in particular is an OLED) in place a transparent adhesive (glue, in particular a UV glue, double-sided adhesive tape) may be used, but preferably no material is added.

The creation of local adhesive contact allows the elements to remain securely fastened to one another during the rest of the process.

Provision is optionally also made to create local adhesive contact between the assembly and at least one of the first and second glazings Each adhesive contact is for example of width of at most 15 mm In particular advantageously, the local adhesive contact is created by local heating of the lamination interlayer (from 60° to 80° C. for PVB) and better still by applying pressure.

The local heating is in particular by induction, hot air, heating element, by radiation (laser etc.).

By way of heating tool (and better still pressure-applying tool) a "soldering iron" with a flat end-fitting (with a (silicone, PTFE elastomer etc.) non-stick coating able to let the heat pass), heating fingers or a hot air gun may be used.

A heating tool that allows the various point adhesive spots to be produced in a single operation may be chosen.

The local protective film may be:
- adhesively bonded on the periphery of the collimation optic
- adhesively bonded beforehand to the rear face of the PVB before point adhesive contact is created preferably by heating
- adhesively bonded to the face of a central PVB with an aperture for the light-emitting element, which is in particular an OLED, and the collimation optic by creation of point adhesive contact preferably by heating.

The covering protective film may be:
- adhesively bonded beforehand to the rear face of the PVB before point adhesive contact is created preferably by heating
- adhesively bonded to the face of a central PVB with an aperture for the light-emitting element, which is in particular an OLED, and the collimation optic by creation of point adhesive contact preferably by heating.

The process may comprise providing what is called a central PVB sheet or a composite sheet consisting of a PVB/functional plastic film such as a PET film bearing an optional functional coating or of a PVB/functional plastic film such as a PET film bearing an optional functional coating/PVB, with a through-aperture housing, pre-lamination, the light-emitting element, in particular the OLED, and optionally the collimation optic adhesively bonded to the exit surface on its periphery—

The process may comprise creating local adhesive contact between the central sheet and the rear or front sheet and/or the light-emitting element, which is in particular an OLED.

Conventionally the lamination includes degassing, and sometimes autoclaving, which implies the implementation of suitable temperatures and pressures; conventionally, during the autoclaving, the sheet, such as the PVB, is brought to a relatively high temperature (higher than 100° C. for PVB), thereby softening it and allowing it to flow. In the case of use of a plurality of in particular PVB sheets, a noteworthy effect then occurs; the interfaces of the various PVB sheets will disappear; the PVB will so to speak scar to form, at the end of the autoclave, a single continuous and uniform film.

The lamination, which may influence the width of the potential aperture, is achieved by reflow of the interlayer. By reflow, the lamination interlayer (first sheet, leaf or composite sheet) with the aperture larger than the light-emitting element and even than the collimation optic.

Each sheet is preferably dimensioned to cover at least 80% or 90% of the face F2, and could extend beyond face F2.

Each sheet is preferably PVB.

BRIEF DESCRIPTION OF THE DRAWINGS

The present invention will now be described in greater detail with reference to the appended figures, in which:

FIG. 1a is a cross-sectional view of the roof according to the invention and with a detail cross-sectional view of the structure of the OLED.

FIG. 1b is a cross-sectional view of the roof according to the invention.

FIG. 1' is an interior-side face-on detail view of the OLED with the collimation optic.

FIG. 1" is an overview of a collimation optic.

FIG. 1''' is an overview of a collimation optic.

FIG. 1X is a cross-sectional view of a collimation optic.

FIG. 1Y is a cross-sectional view of a collimation optic.

FIG. 1Z is an overview of a redirection optic.

FIG. 1e is a cross-sectional view of another alternative roof according to the invention.

FIG. 2' is an overview of a collimation optic.

FIG. 2" is an overview of a collimation optic.

FIG. 3a is a cross-sectional view of a third embodiment of the roof according to the invention.

FIG. 3b is a cross-sectional view of an alternative to the second embodiment of the roof according to the invention.

FIG. 3' is an overview of a collimation optic.

FIG. 3" is an overview of a collimation optic.

FIG. 4e is a view showing a step of mounting, not during lamination, the OLED with the collimation optic on a first PVB lamination interlayer sheet with the aim of producing the laminated glazed roof with integrated reading light according to the invention.

FIG. 4f is a view showing a step of mounting, not during lamination, the OLED with the collimation optic on a first PVB lamination interlayer sheet with the aim of producing the laminated glazed roof with integrated reading light according to the invention.

FIG. 5a is a view showing a step of mounting, not during lamination, the OLED with the collimation optic on a first PVB lamination interlayer sheet with the aim of producing the laminated glazed roof with integrated reading light according to the invention.

FIG. 1 is an exterior-face view of a monolithic (plastic such as PMMA, PC, etc. or glass) or laminated (glass/PVB/glass or plastic) glazed roof 10000 including three reading lights according to the invention, here of 15 cm by 10 cm rectangular shape.

Figure 1C:
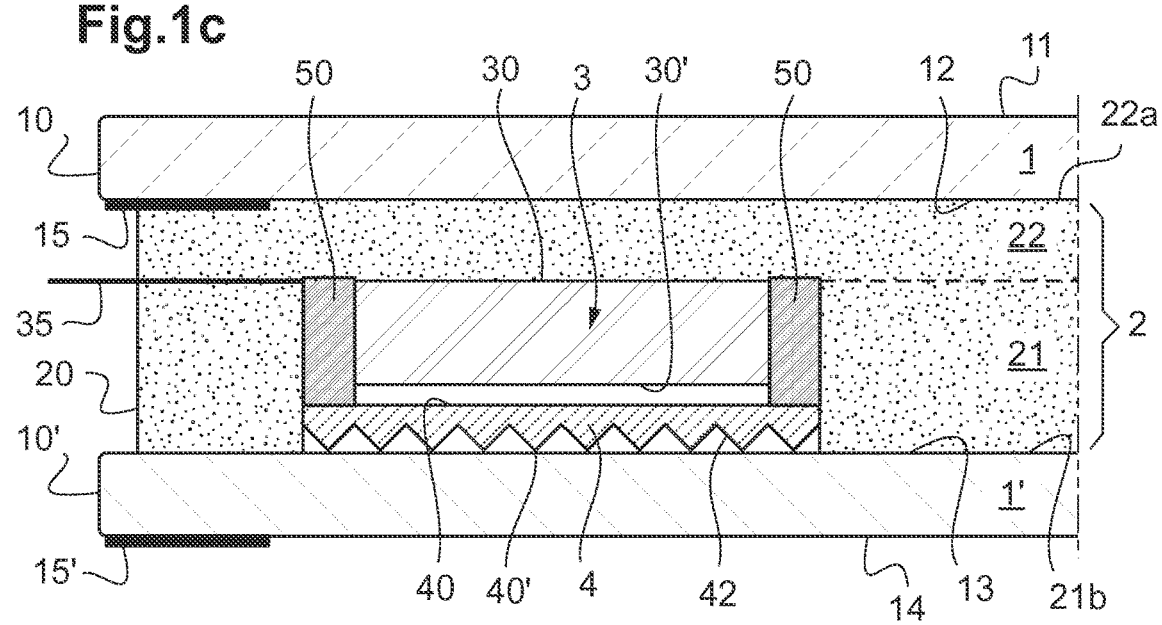
FIG. 1c is a cross-sectional view of one alternative roof according to the invention.

Each reading light includes an areal light source such as an OLED 3 that produces white light that is collimated by a collimation optic 4 that is described in more detail below. Provision may be made for an electrical connector 35 that extends beyond the edge face of the roof and that is partially masked by the enamel 15 on face F4.

FIG. 1a is a cross-sectional view of the reading-light roof according to the invention and with a detail cross-sectional view of the structure of the OLED.

The glazed reading-light roof for a vehicle, in particular a motor vehicle 100a, comprising:
- a first transparent glazing 1, made of mineral or even organic and in particular tinted glass, for example made of (tinted) VG10 glass of 2.1 mm thickness, forming the exterior glazing, with main faces 11, 12 called faces F1 and F2, an edge face 10, and a so-called reference direction that is the horizontal between the front and the rear of the roof
- a second glazing 1', forming the interior glazing, for example made of TSA (or clear or extra-clear) glass and of 2.1 mm thickness or even 1.6 mm thickness or even of less than 1.1 mm thickness (in particular chemically toughened glass), with third and fourth main faces 13, 14 called face F3 and face F4, respectively;
  - between face F2 and face F3, which form the internal faces 12, 13 of the laminated glazing, a lamination interlayer 2, 21, 22 made of polymeric material, here made of PVB, of thickness that is submillimeter-sized and preferably about 1 mm or less, for example of about 0.76 mm for a conventional PVB (RC 41 from Solutia or Eastman) or, as a variant, if necessary, a (three-layer or four-layer) acoustic PVB for example of about 0.81 mm thickness, including a layer of PVB 21 with a face FB making adhesive contact with the (bare or coated) face F3 and an aperture 2a that emerges onto the face F3; the edge face 20 of the PVB in particular being set back, for example by 2 mm, from the edge face of glazings.
  - an optional for example low-emissivity (ITO, etc.) functional layer 16 on face F4 and/or alternatively face F3 is optionally coated with a (heating, low-emissivity, etc.) functional layer that may comprise a zone forming a touch switch for turning on the reading light
- internal and external peripheral masking layers 15', 15 on face F2 and F4, for example made of black enamel.

In the emergent aperture a light-emitting element 3, namely an OLED 3 (or QLED or a TFEL) is housed and able to emit polychromatic (white) light toward face F3, said OLED having an exit surface 30 toward the face F3 and an opposite entrance surface 30 in the bottom of the aperture 2a. The OLED includes a connector 35 that extends beyond the edge face of the first glazing, which is here fastened entrance-surface side on its periphery.

The OLED is a back-emitting OLED including a carrier 3' that bears, face-F2 side, in this order starting from the carrier: an optional functional underlayer 31, a transparent anode 32, an organic light-emitting system 33, a reflective cathode 34 and a (resin, etc.) encapsulating layer 36.

The OLED 3 has an emitting area of length of at least 5 cm and of width of at least 2 cm, and is preferably of submillimeter-sized thickness E0, with an emission half angle at the apex of 50° to 70° and a main emission direction normal to the plane of the OLED.

A collimation optic 4 having a rear face 40 exit-surface side and a front face 40' opposite to the rear face is placed facing the OLED 3. The emergent aperture 2a encircles the OLED 3 and the optic 4 and even makes contact with its edge face or as a variant is spaced apart by at most 0.5 mm and even at most 0.1 mm from this edge face.

The following are for example chosen during manufacture: a first sheet 21, made of PVB, with one through- (or as a variant blind) aperture and a rear second sheet of PVB 22 on the side of the rear face 30. By reflow, the two sheets are optionally joined with a visible interface (here shown by the dotted line). If necessary, the OLED 3 is fastened beforehand to the rear sheet 22 by adhesive bonding 60 or by creating point adhesive contact by applying spot heating (and pressure). Point adhesive contact may be created between the two sheets 21, 22 beyond the OLED 3 zone before or after installation between the two glazings 1, 1'.

The collimation optic 4 is here a prismatic optical film that is fastened on its periphery by a double-sided adhesive or a glue 50 to the exit surface (generating an air-filled cavity entry-side). It is for example an example film 4 of less than 0.3 mm thickness and made of PET that is partially textured in its thickness. FIG. 1X is a cross-sectional view of a collimation optic 4 with pointed apexes S and angles representative of the angle prisms at the apex, angle to plane of the prismatic film). The prismatic optical film 4 includes, on its front face 40', an array of preferably contiguous and even symmetric prisms with apexes S and with a pitch T between the apexes that is from 10 μm to 500 μm, extending longitudinally along an axis making an angle of at most 10° to the reference direction and even parallel.

Each prism being defined by two longitudinal faces 41, 42, each prism has an angle at the apex ranging from 60 to 110°, better still here of 90° and each longitudinal face makes to the plane of the optical film 4 an angle ranging from 30 to 55° and here better still of 45°.

For example, the pitch is 160 μm and the height 80 μm and the remaining thickness is 175 μm (with angle at the apex and valley side of 90°+−20 arc).

Air is between the exit surface and the entrance face of this single first optical film of the collimation optic.

Air is between the prisms of the front face of the collimation optic; the apexes of the features of each front face make physical contact with face F3.

FIG. 1Y is an overview of a collimation optic. This figure differs from the preceding figure in that the apexes are rounded and the lateral faces curved; angles representative of the prisms (angle at the apex, angle to the plane of the film) are defined on the basis of two straight lines b1, b2 that are secant in A, passing through the inflection points I1, I2. The radius of curvature is also limited.

Figure 1:
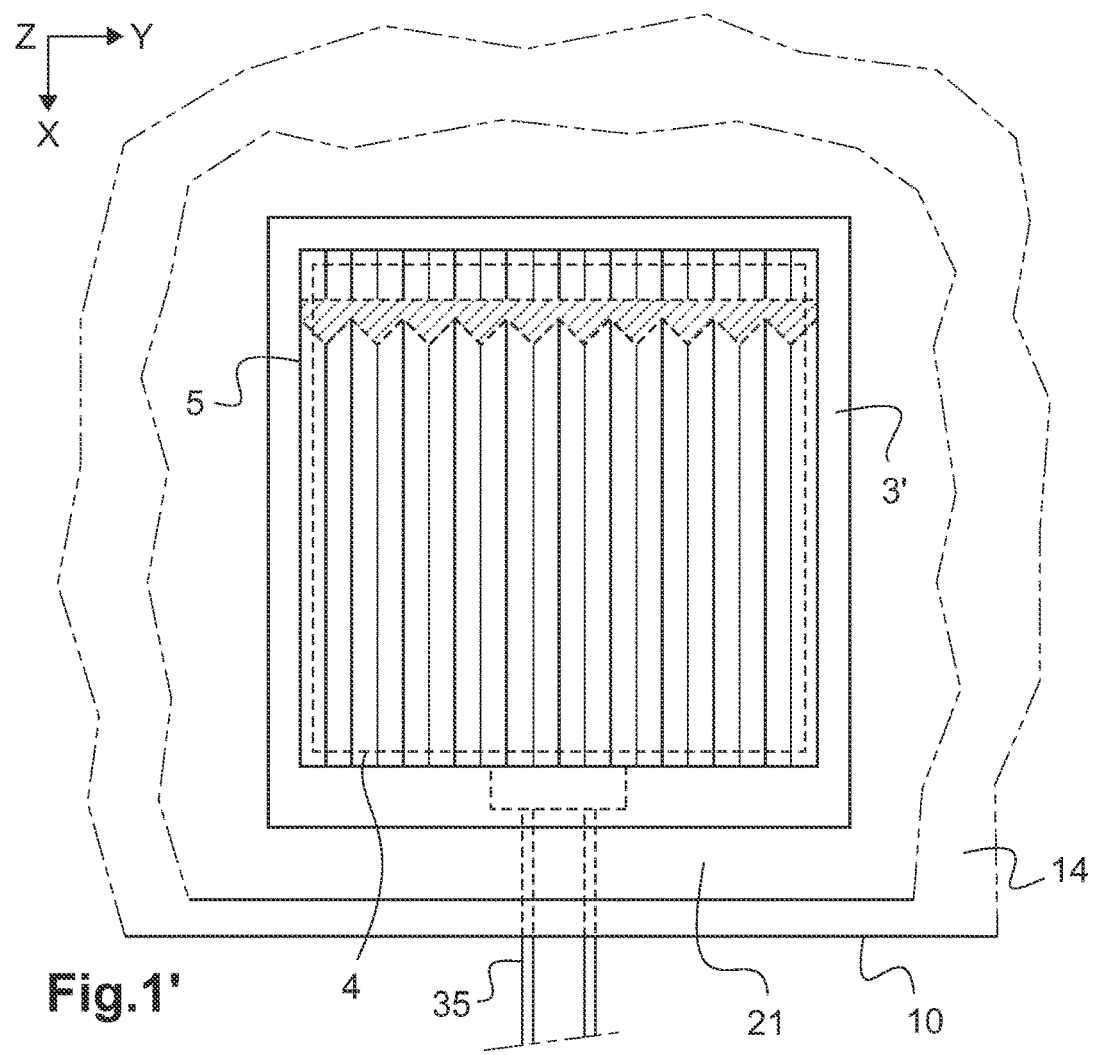
FIG. 1 is an exterior-face view of a monolithic (plastic such as PMMA, PC, etc. or glass) or laminated (glass/PVB/glass or plastic) glazed roof including three reading lights according to an embodiment of the invention.

FIG. 1' is a face-on interior-side detail view of the OLED 3 with the collimation optic 4 adhesively bonded on its periphery 5 for example facing technical edges (on the carrier 3') of the OLED 3. The longitudinal axis of the prisms is the horizontal X between the front and the rear of the roof (of the automobile).

The adhesive bonding may be frame-like and form a seal.

FIG. 1" is an overview of a prismatic collimation optic 4.

FIG. 1''' is an overview of a prismatic collimation optic 4 that differs from the preceding one in that it has flat ends 43 for fastening.

FIG. 1b is a cross-sectional view of a reading-light roof 100b according to the invention.

This figure differs from FIG. 1a in that the collimation optic 4 is larger than the OLED 3 and than the emergent aperture (the through-aperture of the second sheet or front sheet 21) and the collimation optic 4 is here fastened to (or against) face FB 21 of the PVB 2 (front sheet 21) by adhesive bonding 52 (double-sided adhesive etc.) or before lamination by creating point adhesive contact by spot heating (and pressure).

FIG. 1c is a cross-sectional view of one alternative reading-light roof according to the invention.

This figure differs from FIG. 1a in that the collimation optic 4, which is again in the emergent aperture, is larger than the OLED 3 and is adhesively bonded to the PVB 2 (front face of the rear PVB sheet 22) with or without the assistance of a spacer for any adhesive bonding means 50 (double-sided adhesive, glue, etc.).

The reading light may be placed above the location of the passenger compartment to be illuminated or it may be necessary or desired to place the reading light adjacent, offset from this location.

Moreover, the roof furthermore comprises, facing the collimation optic, preferably on the front face of the collimation optic (fastened on its periphery, for example adhesively bonded or welded, or spaced apart therefrom by at most 1 mm) a redirection optic (the collimation optic is between the OLED and the redirection optic) that is a redirection optical film including an array of asymmetric prisms with apexes and with a pitch T' between apexes that is from 10 µm to 500 µm, preferably with at least 4 or even 10 features facing the exit (or light-emitting) surface, FIG. 1Z is an overview of such an asymmetric collimation optic.

The redirection optic thus includes a first optical film 5 that is asymmetric prismatic with, on a main face opposite to the exit surface, called the final front face, said array of asymmetric prisms extending longitudinally along a third axis making an angle of at most 10°, at most 5° or at most 2° to said first axis and even parallel and/or to the reference direction of the glazing (the horizontal between the front and rear) and even is parallel, in particular with a submillimeter-sized thickness.

Each asymmetric prism is defined by first and second longitudinal faces, the prism preferably having a length L and a width W with L>2 W and better still >5 W or >10 W. Each asymmetric prism has an angle at the apex a'0 ranging from 50 to 60° better still of 55°±5° or 55°±2° and the first longitudinal face 51 (called the long side) makes to the plane of the film a first angle, ranging from 31 to 41° better still of 35°±5° or 35°±2° (naturally the second longitudinal face (called the short side) 52 makes to the plane of the film a second angle, ranging from 79 to 99° better still from 85 to 90° or 88 to 90°, and preferably of at most 90°. Preferably, the difference between a4–a3 is larger than 40° and even than 50°.

As a variant, an assembly consisting of two parallel optical films that are asymmetric prismatic is even chosen.

Figure 1D:
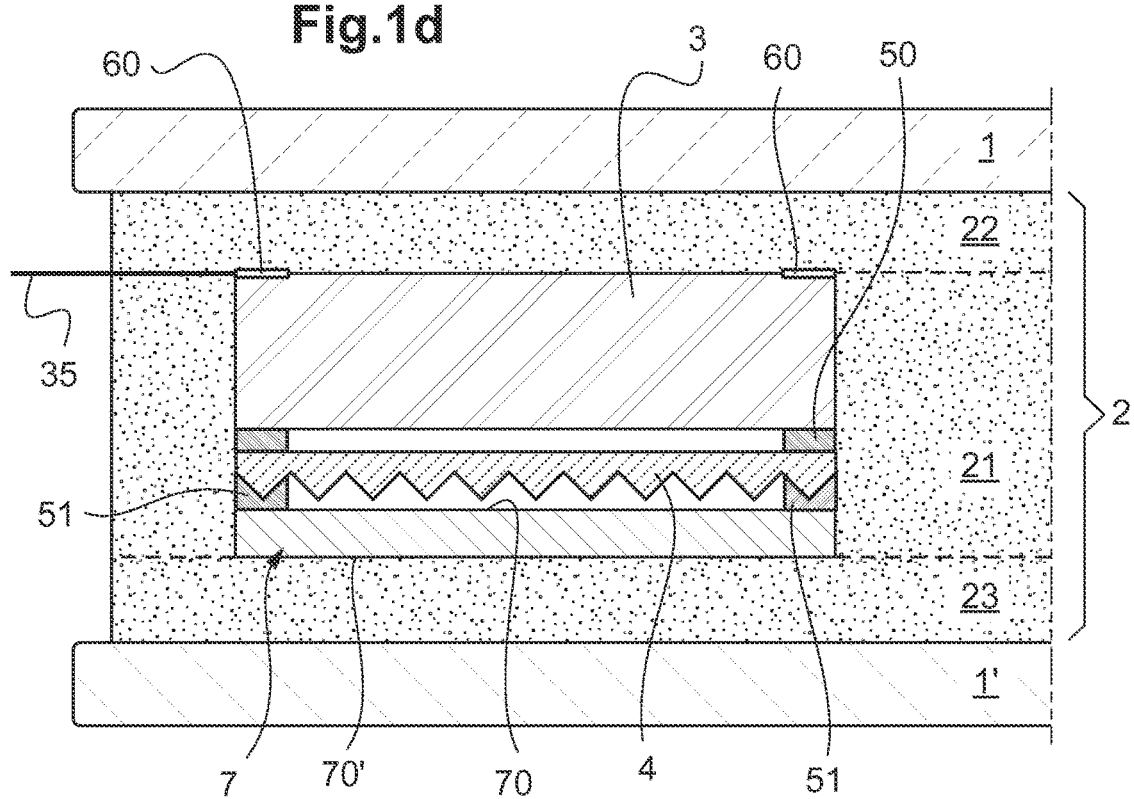
FIG. 1d is a cross-sectional view of another alternative roof according to the invention.

FIG. 1d is a cross-sectional view of another alternative reading-light roof according to the invention.

This figure differs from FIG. 1a in that the aperture in the PVB is internal. For example, during manufacture, a front PVB sheet 23 has been put in place.

To prevent reflow during the lamination from suppressing the optical function, a local plastic protective film 7, for example of less than 0.3 mm thickness and made of PET, is adhesively bonded on the periphery of the front face of the prismatic optical film. This film 7 may also be a capacitive touch button for turning the reading light 3, 4 on/off. It then includes an electrically conductive layer for this purpose.

FIG. 1e is a cross-sectional view of another alternative reading-light roof according to the invention.

This figure differs from the preceding figure in that the plastic protective film 7 is a covering film for example of less than 0.3 mm thickness and made of PET that is adhesively bonded on the periphery of the front face of the prismatic optical film 4 by any adhesive bonding means 52 and/or that simply covers (closes) the emergent aperture. It makes adhesive contact with the front PVB and is for example preassembled with the lamination front PVB in particular so as to form a lamination front assembly consisting of a functional PET 7/front PVB.

This film 7, 71 may be tinted and/or have an electrically conductive functional coating 72 face-F2 or face-F3 side: solar control, low-E, heating . . . and/or zone with on/off touch button.

Figure 2A:
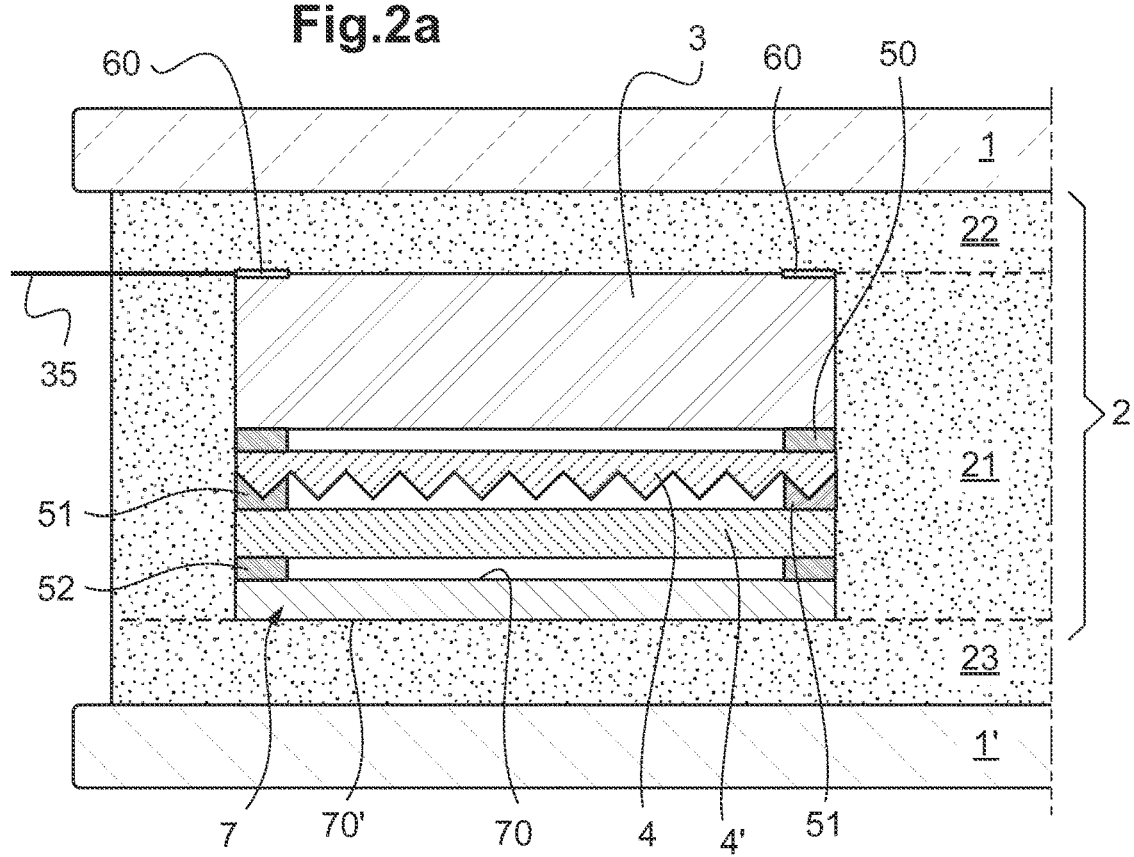
FIG. 2a is a cross-sectional view of a second embodiment of the roof according to the invention.

FIG. 2a is a cross-sectional view of a second embodiment of the reading-light roof according to the invention.

This figure differs from FIG. 1d in that an identical second prismatic film 4' has been added that is crossed at 90° and adhesively bonded 51 (welded, etc.) on its periphery to the first film and adhesively bonded 52 (welded, etc.) on its periphery to the local protective film 7.

FIG. 2' is an overview of a collimation optic with two crossed prismatic films with flat ends (for the adhesive bonding).

FIG. 2" is an overview of a collimation optic.

This figure differs from the preceding one in that the ends are conventional (each a cut from a large film, etc.).

FIG. 3a is a cross-sectional view of a third embodiment of the reading-light roof according to the invention.

This figure differs from FIG. 1a in that the collimation optic 4 (again a textured plastic film, for example a film made of PET of less than 0.6 mm thickness) bears two-dimensional features.

Each two-dimensional feature being defined by a flank 41, 42 and in a plane P normal to the film each two-dimensional feature has an angle at the apex ranging from 60 to 110°, each intersection of the flank with the plane P making to the plane of the film an angle ranging from 30 to 55°. Preferably, an angle at the apex (in the plane P) of 90° and other angles of 45° are chosen.

If the two-dimensional features are recessed, the array of two-dimensional features is an array of cavities, the apexes S are oriented toward the face F2 and the top surface of each cavity is free or makes physical contact with a transparent element, and air is in the cavities.

If the two-dimensional features are raised, the apexes of the features of each front face are free or make physical contact with a transparent element, and air is between the two-dimensional features.

FIG. 3' is an overview of this collimation optic 4 with raised features.

FIG. 3" is an overview of this collimation optic 4 with recessed features (air-filled cavities).

FIG. 3*b* is a cross-sectional view of a third embodiment of the reading-light roof according to the invention.

This figure differs from FIG. 3*a* in that the collimation optic 4 is adhesively bonded to a spacer frame 53 encircling the OLED 3, which is for example against or adhesively bonded to the rear PVB 22.

The optic 4 is here an asymmetric prismatic optical film against or as here fastened on its periphery by a double-sided adhesive or a glue 60 to the face F3.

Figure 4A:
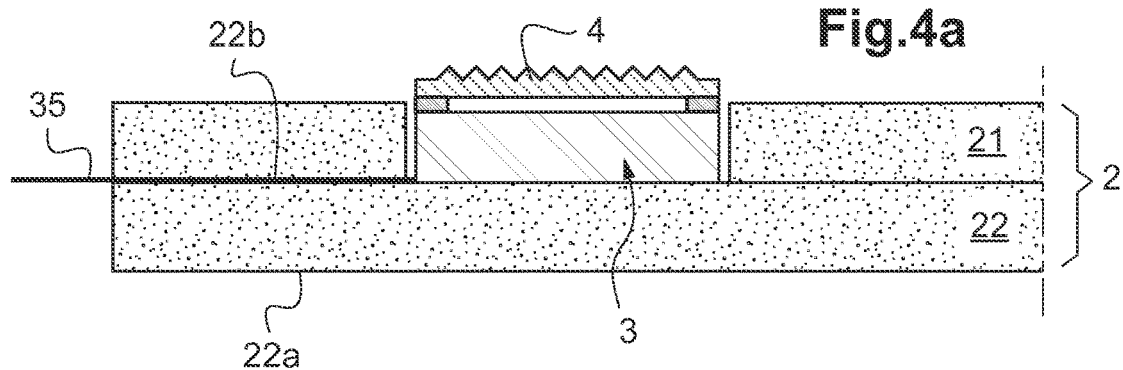
FIG. 4a is a view showing a step of mounting, not during lamination, the OLED with the collimation and redirection optic on a first PVB lamination interlayer sheet with the aim of producing the laminated glazed roof with integrated reading light according to the invention.

FIG. 4*a* is a view showing a step of mounting, not during lamination, the OLED with the collimation optic 4 on a rear first PVB lamination interlayer sheet 22 with the aim of producing the laminated glazed roof with integrated reading light according to the invention.

The collimation optic 4 (a prismatic film or two films that are crossed or that have 2D features) is premounted on the OLED 3 by peripheral adhesive bonding.

A second sheet 21 is used with a through-aperture housing this assembly and with a connector 35 protruding (side of the entrance surface of the OLED 3). The whole thing is placed on the rear sheet (face 22*b*) with local adhesive contact optionally being created by heating and/or pressure (roller) between PVB 21 and PVB 22 outside of the OLED zone or between the OLED and 22 and/or between the connector and the PVBs 21, 22.

As a variant, the apertured sheet is put in place first and bits of it are removed in order to allow assemblies consisting of an OLEDs and optic to be placed in marked zones. If a third PVB sheet is added exit-surface side (front PVB) it is necessary to use a covering or local protective film between the optic and the rear face of this front PVB sheet. For example, a thin transparent plastic film and even a film comprising a functional layer may be used.

Figure 4B:
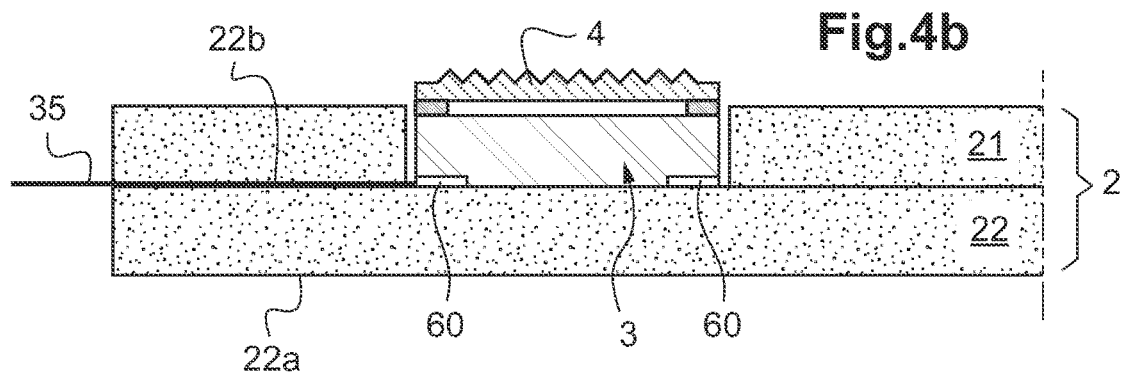
FIG. 4b is a view showing a step of mounting, not during lamination, the OLED with the collimation and redirection optic on a first PVB lamination interlayer sheet with the aim of producing the laminated glazed roof with integrated reading light according to the invention.

FIG. 4*b* is a view showing a step of mounting, not during lamination, the OLED with the collimation optic 4 on a rear first PVB lamination interlayer sheet 22 with the aim of producing the laminated glazed roof with integrated reading light according to the invention.

This figure differs from the preceding figure in that the rear surface of the OLED is fastened by adhesive bonding to the rear sheet 22.

If a third PVB sheet is added exit-surface side (front PVB) it is necessary to use a covering or local protective film between the optic and the rear face of this front PVB sheet. For example, a thin transparent plastic film and even a film comprising a functional layer may be used.

Figure 4C:
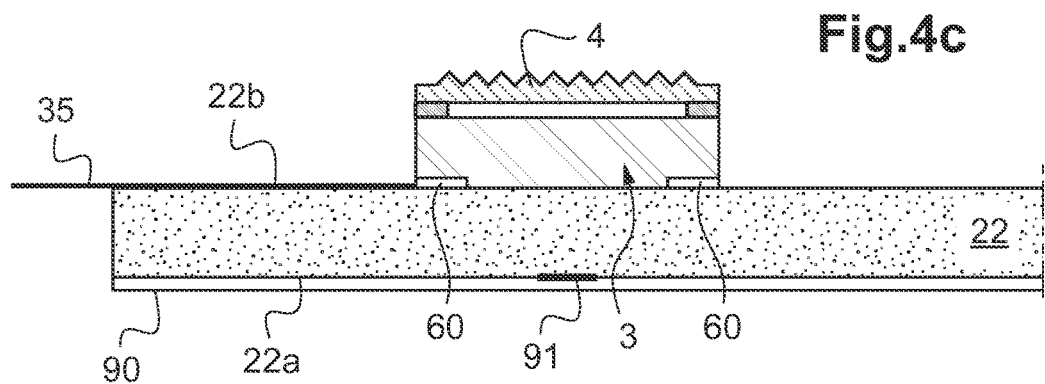
FIG. 4c is a view showing a step of mounting, not during lamination, the OLED with the collimation optic on a first PVB lamination interlayer sheet with the aim of producing the laminated glazed roof with integrated reading light according to the invention.

FIG. 4*c* is a view showing a step of mounting, not during lamination, the OLED with the collimation and redirection optic on a first PVB lamination interlayer sheet with the aim of producing the laminated glazed roof with integrated reading light according to the invention.

This figure differs from the preceding one in that (again) no second sheet with through- or blind aperture is used.

Provision is made to assist with the positioning of the OLED using a film 90 with a reference mark 91 that is either nonstick and against the face 22*a* or opposite the transparent (glass) lamination table.

If a third PVB sheet is added exit-surface side (front PVB) it is necessary to use a covering or local protective film between the optic and the rear face of this front PVB sheet. For example, a thin transparent plastic film and even a film comprising a functional layer may be used.

Figure 4D:
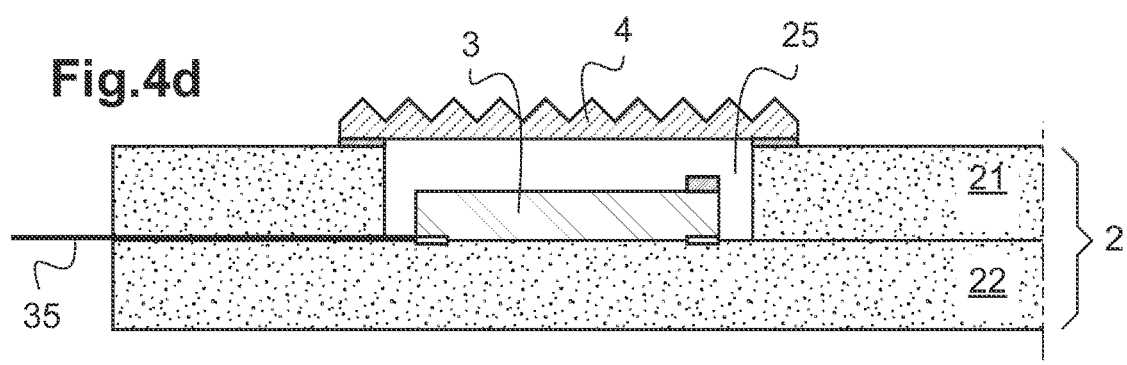
FIG. 4d is a view showing a step of mounting, not during lamination, the OLED with the collimation optic on a first PVB lamination interlayer sheet with the aim of producing the laminated glazed roof with integrated reading light according to the invention.

FIG. 4*d* is a view showing a step of mounting, not during lamination, the OLED with the collimation and redirection optic on a first PVB lamination interlayer sheet with the aim of producing the laminated glazed roof with integrated reading light according to the invention.

This figure differs from FIG. 4*a* in that the collimation optic 4, which is larger than the hole 25, is fastened against the front face of the apertured sheet 21 by adhesive bonding or as a variant by creating adhesive contact (heating and/or pressure). The optic closes the hole and is spaced apart from the OLED.

If a third PVB sheet is added exit-surface side (front PVB) it is necessary to use a covering or local protective film between the optic and the rear face of this front PVB sheet. For example, a thin transparent plastic film and even a film comprising a functional layer may be used.

FIG. 4*e* is a view showing a step of mounting, not during lamination, the OLED with the collimation and redirection optic on a first PVB lamination interlayer sheet with the aim of producing the laminated glazed roof with integrated reading light according to the invention.

This figure differs from FIG. 4*c* in that the collimation optic 4, which is larger than the OLED, is fastened against the front face of the rear sheet by adhesive bonding 52 with or without spacer.

If a third PVB sheet is added exit-surface side (front PVB) it is necessary to use a covering or local protective film between the optic and the rear face of this front PVB sheet. For example, a thin transparent plastic film and even a film comprising a functional layer may be used.

FIG. 4*f* is a view showing a step of mounting, not during lamination, the OLED with the collimation and redirection optic on a first PVB lamination interlayer sheet with the aim of producing the laminated glazed roof with integrated reading light according to the invention.

This figure differs from FIG. 4*b* in that the second PVB sheet comprises a blind aperture 25 and the optic 4 is protected from the bottom by a local protective film in the aperture.

FIG. 5*a* is a view showing a step of mounting, not during lamination, the OLED with the collimation and redirection optic on a first PVB lamination interlayer sheet with the aim of producing the laminated glazed roof with integrated reading light according to the invention.

This figure differs from the preceding figure in that the protective film is adhesively bonded to the bottom by adhesive bonding or creating local adhesive contact (heating and/or pressure).

Figure 6A:
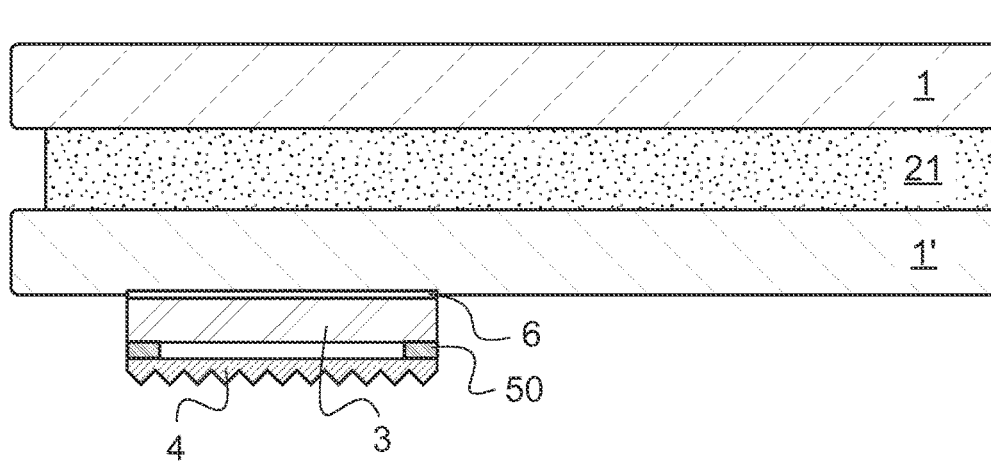
FIG. 6a is a cross-sectional view of the OLED mounted on a laminated glazing according to the invention.

FIG. 6*a* is a cross-sectional view of the reading light mounted on a laminated glazed roof according to the invention.

This figure differs from FIG. 1*a* in that the reading light is on face F4. The rear surface of the OLED 3 is adhesively bonded (adhesive, etc. 6) to face F4.

Figure 6B:
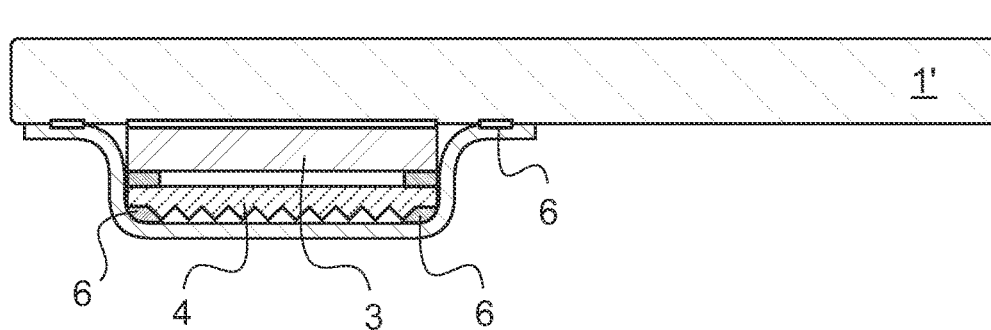
FIG. 6b is a cross-sectional view of the OLED mounted on a single glazing according to the invention.

FIG. 6*b* is a cross-sectional view of the reading light mounted on a single-glazed roof according to the invention.

This figure differs from the preceding one in that a front protective film 7 also serves to fasten the assembly consisting of the OLED 3 and optic by adhesive 6.

This film 7 may be local or covering and for example a film with a functional layer, etc.

Figure 6C:
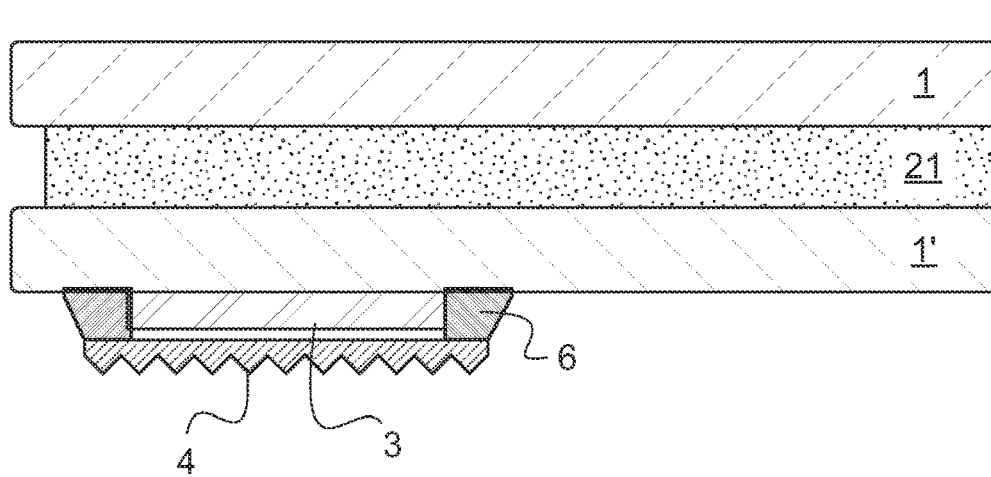
FIG. 6c is a cross-sectional view of a variant of the OLED mounted on a laminated glazing according to the invention. All of the figures illustrate, by way of light source, an OLED, but, as a variant, a QLED or TFEL may be chosen. The figures are not to scale.

FIG. 6*c* is a cross-sectional view of a variant of the OLED mounted on a laminated glazing according to the invention.

This figure differs from FIG. 6*a* in that the optic is larger than the OLED 3 and is fastened by adhesive 6 to face F4.

The invention claimed is:

1. A luminous glazed roof for a vehicle, said roof comprising:
    a first transparent glazing, made of mineral or organic glass, with a first and a second main face, an edge face;
    a light-emitting element on the second main face side and able to emit polychromatic light on a side opposite to the second main face, which corresponds to an interior side of the vehicle, said light-emitting element having an exit surface interior-side;

facing said light-emitting element and interior-side, a collimation optic having a rear face exit-surface side and a front face opposite to the rear face, wherein the light-emitting element has an emitting area of length of at least 5 cm and of width of at least 2 cm with an emission half angle at the apex of 50° to 70° and a main emission direction normal to the plane of said light-emitting element, and wherein the collimation optic, which is made of transparent material, includes an optical film or a set of optical films each including on a front face opposite to the exit surface an array of features with apexes S and with a pitch T between apexes that is from 10 µm to 500 µm, the collimation optic includes:

a) a first optical film, with said array of features that are two-dimensional, b) or a set of at least two optical films that are prismatic, including in this order starting from the exit surface:

a first optical film with said array of features that are prisms extending longitudinally along a first axis, and, facing the first optical film, a second optical film with a second array of features that are prisms extending longitudinally along a second axis making an angle to said first axis of 90±10°, the first or the second axis makes to a reference direction an angle of at most 10°, the reference direction corresponding to an horizontal between a front and a rear of the roof, c) or a single first optical film with said array of features that are prisms extending longitudinally along an axis making an angle of at most 10° to the reference direction, wherein for a) each two-dimensional feature being defined by a flank and in a plane P normal to the optical film each two-dimensional feature has an angle at the apex ranging from 60 to 110°, each intersection of the flank with the plane P making to the plane of the optical film an angle ranging from 30 to 55°, wherein for b) and c) each prism being defined by two longitudinal faces each prism has an angle at the apex ranging from 60 to 110°, and each longitudinal face makes to the plane of the prismatic optical film an angle ranging from 30 to 55°, and wherein:

air is between the exit surface and the entrance face of the prismatic first optical film of the collimation optic, for b) and c) air is between the prisms of the front face of the collimation optic, the apexes of the features of each front face are free or make physical contact with a transparent element, for a) the two-dimensional features are recessed, the array of two-dimensional features is an array of cavities, the apexes S are oriented toward the second main face and the top surface of each cavity is free or makes physical contact with a transparent element, air is in the cavities or the two-dimensional features are raised, the apexes of the features are free or make physical contact with a transparent element, air is between the two-dimensional features.

2. The luminous glazed vehicle roof as claimed in claim 1, further comprising a redirection optic facing the collimation optic, the collimation optic is between the light-emitting element and the redirection optic, which redirection optic includes a redirection optical film or a set of redirection optical films each including on a front face opposite to the exit surface an array of asymmetric prisms with apexes and with a pitch T' between apexes that is from 10 µm to 500 µm, each asymmetric prism being defined by first and second longitudinal faces, each asymmetric prism has an angle at the apex ranging from 50 to 60° and the first longitudinal face makes to the plane of the asymmetric redirection optical film a first angle ranging from 31 to 41°.

3. The luminous glazed vehicle roof as claimed in claim 1, wherein the features are contiguous or essentially contiguous.

4. The luminous glazed vehicle roof as claimed in claim 1, wherein the light-emitting element is an organic light-emitting diode, or a quantum-dot light-emitting diode.

5. The luminous glazed vehicle roof as claimed in claim 1, wherein the or each optical film is a plastic film that is partially textured in its thickness or with a textured layer.

6. The luminous glazed vehicle roof as claimed in claim 1, wherein the set of optical films has a thickness of at most 1 mm.

7. The luminous glazed vehicle roof as claimed in claim 1, wherein the light-emitting element is a back-emitting OLED including a carrier that bears, on the second main face side, in this order starting from the carrier: an optional functional underlayer, a transparent anode, an organic light-emitting system, a reflective cathode.

8. The luminous laminated glazed vehicle roof as claimed in claim 1, further comprising an element for electrically connecting said light-emitting element, which is connected to said light-emitting element and which extends beyond the edge face of the first glazing.

9. The luminous glazed vehicle roof as claimed in claim 1, wherein the collimation optic is against or fastened to the light-emitting element, via its rear face, on the periphery of the exit surface and/or the collimation optic or the optional redirection optic is fastened to the transparent element, on the periphery of the front face.

10. The luminous laminated glazed vehicle roof as claimed in claim 1, further comprising a laminated glazing including:

said first transparent glazing, a second transparent glazing made of mineral or organic glass, with a third and a fourth main face, between the second and third main faces, which are internal faces of the laminated glazing, a transparent lamination interlayer that is optionally tinted and/or optionally composite in its thickness, made of polymeric material, said lamination interlayer film having a main face oriented toward the second main face and making adhesive contact with the second main face and another main face oriented toward the third main face and making adhesive contact with the third main face.

11. The luminous glazed vehicle roof as claimed in claim 1, wherein the second main face is free, the glazed vehicle roof is monolithic, the light-emitting element is on the second main face or if the glazing is laminated and the light-emitting element is on a free face of a second transparent glazing, the collimation optic is fastened to the light-emitting element on the periphery of the exit surface, via its rear face and on its periphery and/or the assembly consisting of the light-emitting element/collimation optic/optional redirection optic is fastened on its periphery to the free face via a front protective film that is said transparent element with a protruding fastening portion and/or the light-emitting element is fastened via its entrance surface to the free face.

12. The luminous glazed vehicle roof as claimed in claim 1, further comprising a laminated glazing including:
said first transparent glazing,
a second transparent glazing made of mineral or organic glass, with third and fourth main faces,
between the second and third main faces, which are the internal faces of the laminated glazing, a transparent lamination interlayer, which is optionally tinted and/or optionally composite in its thickness, made of polymeric material, said lamination interlayer film having a main face oriented toward the second main face and making adhesive contact with the second main face and another main face oriented toward the third main face and making adhesive contact with the third main face, the collimation optic or the optional redirection optic is larger than the light-emitting element and is fastened on its periphery, or on its periphery makes adhesive contact via its rear face with, said lamination interlayer.

13. The luminous glazed vehicle roof as claimed in claim 10, wherein the collimation optic is between the second main face and the third main face, the light-emitting element is between the second main face and the third main face and in the zone with the light-emitting element, the main face makes adhesive contact with the second main face and optionally the other main face makes adhesive contact with the entrance surface, the transparent element being the second glazing.

14. The luminous glazed vehicle roof as claimed in claim 10, wherein the collimation optic is between the second main face and third main face, the light-emitting element is between the second main face and the third main face and in the zone with the light-emitting element the main face makes adhesive contact with the second main face or on the side of the exit surface, and the other main face in adhesive contact with the third main face and the transparent element is a plastic protective film, on the front face of the collimation optic or of the optional redirection optic, with a face oriented toward the third main face and in adhesive contact with the lamination interlayer, said plastic protective film being local optionally with an extension zone extending beyond the edges of the front face by at most 10 cm.

15. The luminous glazed vehicle roof as claimed in claim 14, wherein the local protective film includes a plastic film bearing an electrically conductive layer or wherein the protective film is covering and includes a plastic film bearing an electrically conductive layer that is a heating layer, solar-control or low-emissivity layer, capacitive touch button for turning on the light-emitting element.

16. The luminous glazed vehicle roof as claimed in claim 10, wherein the lamination interlayer is composite and includes the following stack outside of the zone of the light-emitting element: PVB/functional plastic film with an optional electrically conductive functional coating oriented toward the second main or the third main/PVB, the functional plastic film extending over the second main face,
and wherein the light-emitting element is between the second main and the third main face, between the front face and the third main face is present said plastic film/said PVB, and the transparent element is said functional plastic film on the front face of the collimation optic or the optional redirection optic.

17. The luminous glazed vehicle roof as claimed in claim 10, wherein the lamination interlayer includes an acoustic PVB and/or is tinted.

18. The luminous glazed vehicle roof as claimed in claim 10, wherein the light-emitting element is housed in an aperture of the lamination interlayer, the aperture is blind with a bottom in the direction of the second main face and emerges onto the third main face, or the aperture is an internal aperture and is in the thickness of the lamination interlayer and said transparent element is a protective film that is local, housed in said internal aperture, or that is larger than said internal aperture and covering said internal aperture.

19. A vehicle including at least one luminous glazed roof as claimed in claim 1.

20. A process for manufacturing a glazed roof as claimed in claim 1, comprising:
before installation in the first glazing, pre-mounting on the light-emitting element of the film-based collimation optic or even of the film-based redirection optic and even of a protective film on the last redirection or collimation optical film.

21. A process for manufacturing the laminated glazed roof as claimed in claim 1, comprising:
positioning the light-emitting element on an unapertured lamination interlayer sheet or in a through- or blind aperture and simultaneously or separately positioning the collimation optic facing the light-emitting element and the optional redirection optic on the collimation optic and successively:
installing the assembly positioned between the first and second glazing,
laminating under vacuum and with heating or even under pressure.

22. The luminous laminated glazed roof manufacturing process as claimed in claim 21, wherein the light-emitting element is positioned on said lamination-interlayer sheet in a through- or blind aperture entrance-surface side, with the collimation optic and the optional redirection optic housed in the aperture and fastened, on the periphery of the exit surface or with the collimation optic or the optional redirection optic capping the aperture and on said lamination-interlayer sheet.

23. The luminous laminated glazed roof manufacturing process as claimed in claim 21, wherein the light-emitting element is positioned on said unapertured lamination interlayer sheet with a positioning aid.

24. The luminous laminated glazed roof manufacturing process as claimed in claim 21, wherein said interlayer sheet is an optionally acoustic PVB sheet or is a PVB/functional plastic film or PVB/functional plastic film/PVB composite, the positioning being on the PVB or on the functional film.

25. The luminous laminated glazed roof manufacturing process as claimed in claim 21, further comprising, before said positioning, fastening a local protective film to the front face of the collimation or optional redirection optic and during said positioning said lamination interlayer has a blind hole housing the local protective film or said lamination interlayer has a through-hole and another lamination interlayer closes the hole.

26. The luminous laminated glazed roof manufacturing process as claimed in claim 21, wherein said lamination interlayer having a through-hole housing the light-emitting element, and the collimation optic and the optional redirection optic, the process comprises placing a protective film closing said hole and another interlayer sheet covering the protective film optionally already in adhesive contact with the protective film.

27. The luminous laminated glazed roof manufacturing process as claimed in claim 21, comprising creating point adhesive contact by heating outside of the zone of the light-emitting element:

between said interlayer sheet and another rear interlayer sheet entrance-surface side and/or between said interlayer sheet and another front interlayer sheet exit-surface side, and/or between the collimation optic or optional redirection optic and the interlayer sheet or another interlayer sheet, the light-emitting element and the collimation optic and the optional redirection optic being in a through- or blind hole of one of said interlayer sheets and/or the light-emitting element and the collimation optic and the optional redirection optic being sandwiched between said interlayer sheet and the rear or front other interlayer sheet.

28. The luminous laminated glazed roof manufacturing process as claimed in claim 21, comprising creating point adhesive contact by heating between the light-emitting element and said interlayer sheet and/or said light-emitting element and another interlayer sheet.

* * * * *